United States Patent
Zhang et al.

(10) Patent No.: US 11,515,943 B2
(45) Date of Patent: Nov. 29, 2022

(54) OPTICAL COMMUNICATIONS APPARATUS, OPTICAL LINE TERMINATION, AND OPTICAL COMMUNICATION PROCESSING METHOD

(71) Applicant: HUAWEI TECHNOLOGIES CO., LTD., Guangdong (CN)

(72) Inventors: Ying Zhang, Dongguan (CN); Huafeng Lin, Dongguan (CN); Yuanmou Li, Dongguan (CN); Xiaoyuan Wu, Dongguan (CN); Jun Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/365,756

(22) Filed: Jul. 1, 2021

(65) Prior Publication Data
US 2021/0328674 A1    Oct. 21, 2021

Related U.S. Application Data

(63) Continuation of application No. PCT/CN2019/070298, filed on Jan. 3, 2019.

(51) Int. Cl.
*H04B 10/27* (2013.01)
*H04B 10/25* (2013.01)
*H04Q 11/00* (2006.01)

(52) U.S. Cl.
CPC ............. *H04B 10/27* (2013.01); *H04B 10/25* (2013.01); *H04Q 11/0062* (2013.01)

(58) Field of Classification Search
CPC ..... H04B 10/25; H04B 10/27; H04Q 11/0062
(Continued)

(56) References Cited

U.S. PATENT DOCUMENTS 8,823,414 B2    9/2014  Thirugnanam et al.
2006/0171714 A1  8/2006  Dove
(Continued)

FOREIGN PATENT DOCUMENTS

CN    1866958 A    11/2006
CN    102201862 A    9/2011
(Continued)

OTHER PUBLICATIONS

Extended European Search Report issued in European Application No. 19907081.4 dated Dec. 3, 2021, 6 pages.
(Continued)

*Primary Examiner* — Dalzid E Singh
(74) *Attorney, Agent, or Firm* — Fish & Richardson P.C.

(57) ABSTRACT

This application provides example optical communications apparatuses. One example optical communications apparatus includes a control apparatus and an optical module matching apparatus. The control apparatus can output a first control signal to the control end. An input end of the optical module matching apparatus can connect to a first optical module and receive a first electrical signal output by the first optical module. An output end of the optical module matching apparatus can output a first serial signal. The control apparatus can output a second control signal to the control end. The input end of the optical module matching apparatus can receive a second electrical signal output by the second optical module. The output end of the optical module matching apparatus can output a second serial signal. The first electrical signal and the second electrical signal can have different level types.

21 Claims, 13 Drawing Sheets

(58) Field of Classification Search
USPC .......................................................... 398/58
See application file for complete search history.

(56) References Cited

U.S. PATENT DOCUMENTS

| | | | | |
|---|---|---|---|---|
| 2007/0171943 | A1* | 7/2007 | Huang | H04J 3/1694 370/522 |
| 2009/0060507 | A1* | 3/2009 | Effenberger | H04J 14/0246 398/60 |
| 2011/0064417 | A1* | 3/2011 | Sato | H04B 10/40 398/135 |
| 2012/0008937 | A1* | 1/2012 | Cheng | H04B 10/272 398/1 |
| 2012/0307931 | A1* | 12/2012 | Johnson | H04L 25/026 375/295 |
| 2013/0089338 | A1 | 4/2013 | Silberman | |
| 2013/0300455 | A1* | 11/2013 | Thirugnanam | H03K 19/018514 326/82 |
| 2016/0381760 | A1 | 12/2016 | Xiong et al. | |
| 2018/0124481 | A1* | 5/2018 | Chyi | H04Q 11/0062 |

FOREIGN PATENT DOCUMENTS

| | | |
|---|---|---|
| CN | 102480651 A | 5/2012 |
| CN | 202696605 U | 1/2013 |
| CN | 103178923 A | 6/2013 |
| CN | 205847288 U | 12/2016 |
| CN | 106506094 A | 3/2017 |
| CN | 106571990 A | 4/2017 |
| CN | 107438950 A | 12/2017 |
| CN | 107529100 A | 12/2017 |
| CN | 105264853 B | 11/2018 |
| WO | 2005099298 A1 | 10/2005 |

OTHER PUBLICATIONS

Ju, Interfacing LVDS with other Differential-I/0 Types, EON Electrical Design News, vol. 48, No. 24, Oct. 30, 2003, 4 pages.
Office Action issued in Chinese Application No. 201980022440.8 dated Oct. 26, 2021, 4 pages.
Office Action issued in Chinese Application No. 201980022440.8 dated Apr. 25, 2021, 21 pages (with English translation).
PCT International Search Report and Written Opinion issued in International Application No. PCT/CN2019/070298 dated Jun. 27, 2019, 17 pages (with English translation).

* cited by examiner

ોptical COMMUNICATIONS APPARATUS, OPTICAL LINE TERMINATION, AND OPTICAL COMMUNICATION PROCESSING METHOD

CROSS-REFERENCE TO RELATED APPLICATIONS

This application is a continuation of International Patent Application No. PCT/CN2019/070298, filed on Jan. 3, 2019, the disclosure of which is hereby incorporated by reference in its entirety.

TECHNICAL FIELD

Embodiments of this application relate to the communications field and, in particular, to an optical communications apparatus, an optical line termination, and an optical communication processing method.

BACKGROUND

In a passive optical network (PON) communications system, a plurality of optical network units (ONU) are connected to a single service port of an optical line termination (OLT) by using a feeder optical fiber, an optical splitter, and a distribution optical fiber to form a service channel.

Currently, devices in the PON communications system have evolved from a gigabit-capable passive optical network (GPON) to a 10 gigabit-capable passive optical network (XG-PON) and then to a 10 gigabit-capable symmetric passive optical network (XGS-PON). Because devices in different generations of PON communications systems have different transmission rates, a matching OLT and ONU need to be used for each generation.

A current OLT is used as an example, an optical transmitter and an optical receiver that are of the service port of the OLT are separated and assembled into a single integrated optical transceiver module (hereinafter referred to as an optical module), to facilitate overall maintenance and replacement. Each generation of OLT must match a corresponding optical module. For example, the first generation of GPON OLT matches a GPON OLT optical module that supports a downstream wavelength of 1490 nanometers (nm) and a rate of 2.48832 Gbps (1000 bytes per second, Gbps), and that supports an upstream wavelength of 1310 nm and a rate of 1.24416 Gbps. The second generation of XG-PON OLT matches an XG-PON OLT optical module that supports a downstream wavelength of 1577 nm and a rate of 9.95328 Gbps, and that supports an upstream wavelength of 1270 nm and a rate of 2.48832 Gbps. The third generation of XGS-PON OLT matches an XGS-PON OLT optical module that supports a downstream wavelength of 1577 nm and a rate of 9.95328 Gbps, and that supports an upstream wavelength of 1270 nm and a rate of 9.95328 Gbps.

In the prior art, devices in different generations of PON communications systems have different transmission rates, and a matching OLT, optical module, and ONU need to be used for each generation of PON communications system. Different generations of optical modules have different upstream and downstream rates or different signal level types. Therefore, the different generations of optical modules cannot be used as substitutes. In the prior art, each generation of OLT can adapt only to an optical module and an ONU of a same generation as the OLT. When an operator needs to upgrade an old generation of OLT to a new generation of OLT, the operator also needs to, according to the prior art, upgrade an old generation of optical module to a new generation of optical module, and upgrade an old generation of ONU to a new generation of ONU. Among all optical modules and ONUs connected to the OLT, some users need to upgrade the optical modules and the ONUs while some users do not need to upgrade the optical modules and the ONUs. However, according to the prior art, the OLT, the optical module, and the ONU can only be upgraded at the same time, but different users have different urgency degrees of upgrading the optical modules and the ONUs. Therefore, upgrading all the optical modules and the ONUs causes unnecessary replacement costs of the optical modules and the ONUs, and causes serious resource waste.

SUMMARY

Embodiments of this application provide an optical communications apparatus, an optical line termination, and an optical communication processing method so that a same optical communications apparatus can be compatible with different generations of optical modules. When a user does not need to upgrade an optical module and an ONU, the optical module and the ONU do not need to be upgraded or replaced. This reduces costs.

To resolve the foregoing problem, the embodiments of this application provide the following technical solutions.

According to a first aspect, an embodiment of this application provides an optical communications apparatus. The optical communications apparatus includes a control apparatus and an optical module matching apparatus, where the control apparatus is connected to a control end of the optical module matching apparatus. The control apparatus is configured to output a first control signal to the control end so that the optical module matching apparatus is in a first working mode, where an input end of the optical module matching apparatus is configured to connect to a first optical module, and receive a first electrical signal output by the first optical module, and an output end of the optical module matching apparatus outputs a first serial signal. The control apparatus is further configured to output a second control signal to the control end so that the optical module matching apparatus is in a second working mode, where the input end of the optical module matching apparatus is further configured to connect to a second optical module, and receive a second electrical signal output by the second optical module, and the output end of the optical module matching apparatus outputs a second serial signal. The first electrical signal and the second electrical signal have different level types.

In this embodiment of this application, the optical communications apparatus includes the control apparatus and the optical module matching apparatus. The control apparatus is connected to the control end of the optical module matching apparatus. The control apparatus is configured to output the first control signal to the control end so that the optical module matching apparatus is in the first working mode. The input end of the optical module matching apparatus is configured to connect to the first optical module and receive the first electrical signal output by the first optical module. Then, the output end of the optical module matching apparatus outputs the first serial signal. The control apparatus is further configured to output the second control signal to the control end so that the optical module matching apparatus is in the second working mode. The input end of the optical module matching apparatus is further configured to connect to the second optical module, and receive the second electrical signal output by the second optical module. Then, the output end of the optical module matching apparatus outputs the second serial signal. The first electrical signal and the second electrical signal have different level types. When the input end of the optical communications apparatus provided in this embodiment of this application inputs different electrical signals, the output end of the optical communications apparatus may output different serial signals. Therefore, the optical module matching apparatus in this embodiment of this application may be configured to connect to different optical modules, and a same optical communications apparatus can be compatible with different generations of optical modules. When a user does not need to upgrade an optical module and an ONU, the optical module and the ONU do not need to be upgraded or replaced. This reduces costs. In addition, when the user needs to upgrade the optical module and the ONU, the optical module matching apparatus compatible with the different optical modules is used in the optical communications apparatus, and the entire optical communications apparatus does not need to be upgraded. This reduces costs.

In a possible implementation of the first aspect, the first electrical signal and the second electrical signal have different serial data rates. The first optical module and the second optical module separately output electrical signals at different serial data rates. In an actual application, a serial data rate of an output electrical signal may be determined based on a type of the optical module.

In a possible implementation of the first aspect, the optical communications apparatus further includes at least one of the following modules: the first optical module and the second optical module.

In a possible implementation of the first aspect, the optical communications apparatus further includes a media access control MAC chip. The control apparatus is connected to the MAC chip, the MAC chip supports a first optical communication protocol and a second optical communication protocol, and the output end of the optical module matching apparatus is connected to the MAC chip. When the first serial signal is output to the MAC chip, the MAC chip parses the signal according to the first optical communication protocol. When the second serial signal is output to the MAC chip, the MAC chip parses the signal according to the second optical communication protocol. The output end of the optical module matching apparatus may be connected to the MAC chip. The optical module matching apparatus described herein may be directly connected to the MAC chip or indirectly connected to the MAC chip. For example, the MAC chip has an input end, and the input end of the MAC chip is directly connected to the output end of the optical module matching apparatus. For another example, a serial-to-parallel conversion apparatus is connected between the MAC chip and the optical module matching apparatus. The serial-to-parallel conversion apparatus may be specifically a serdes apparatus. A serial signal output by the optical module matching apparatus is converted into a parallel signal by the serial-to-parallel conversion apparatus, and then the parallel signal may be input to the MAC chip.

In a possible implementation of the first aspect, optical signals respectively generated by using the first optical communication protocol and the second optical communication protocol have different serial data rates.

In a possible implementation of the first aspect, the optical module matching apparatus includes a first resistor, a second resistor, a first switch, a first capacitor, and two transmission lines. The first switch includes the control end. The input end and the output end are separately connected to two ends of the transmission line. The first resistor and the second resistor are connected in series and then bridged between the two transmission lines. An intermediate point between the first resistor and the second resistor that are connected in series is connected to a ground point by using the first capacitor. The first switch is bridged between the intermediate point and the ground point. The first control signal controls the first switch to be opened so that the optical module matching apparatus is in the first working mode, and the second control signal controls the first switch to be closed so that the optical module matching apparatus is in the second working mode. Alternatively, the first control signal controls the first switch to be closed so that the optical module matching apparatus is in the first working mode, and the second control signal controls the first switch to be opened so that the optical module matching apparatus is in the second working mode. The first switch includes the control end. A processor of an OLT board is connected to the control end. The two ends of the transmission line are respectively connected to the input end and the output end of the optical module matching apparatus. The input end of the optical module matching apparatus is connected to an output end of the optical module, and the output end of the optical module matching apparatus is connected to the serial-to-parallel conversion apparatus. The first resistor and the second resistor are connected in series and then bridged between the two transmission lines. The processor of the OLT board may control the first switch to be opened or closed through the control end.

In a possible implementation of the first aspect, the optical module matching apparatus includes a buffer and two transmission lines. The buffer includes the control end. The input end and the output end are separately connected to two ends of the transmission line. An output end of the buffer is connected in series to the two transmission lines in an alternating-current coupling manner. To resolve a prior-art problem that a common-mode voltage of a signal input by the serial-to-parallel conversion apparatus is relatively high, the output end of the buffer is connected in series to the two transmission lines in the alternating-current coupling manner. After outputting a signal, the buffer can be used to connect to a serdes input port in the alternating-current coupling manner to solve the problem that the common-mode voltage is too high after a direct-current coupling of the electrical signal output by the optical module.

In a possible implementation of the first aspect, the buffer includes a third resistor, a fourth resistor, a fifth resistor, a second switch, and a second capacitor. The second switch includes the control end. The third resistor and the fourth resistor are connected in series and then bridged between the two transmission lines. An intermediate point between the third resistor and the fourth resistor that are connected in series is connected to a ground point by using the second capacitor. The fifth resistor and the second switch are connected in series and then bridged between the intermediate point and the ground point. The first control signal controls the second switch to be opened so that the optical module matching apparatus is in the first working mode, and the second control signal controls the second switch to be closed so that the optical module matching apparatus is in the second working mode. Alternatively, the first control signal controls the second switch to be closed so that the optical module matching apparatus is in the first working mode, and the second control signal controls the second switch to be opened so that the optical module matching apparatus is in the second working mode. Therefore, the processor may control, by using the control end, the second switch to be opened or closed. In this embodiment of this application, the buffer includes an input end and the output end that have a level compatibility matching function. Direct-current coupling terminal matching circuits of the LVPECL level and the CML level may be used as output ports of the buffer, and after outputting a signal, the buffer is connected to a serdes input port in an alternating-current coupling manner. The buffer provided in this embodiment of this application can buffer a signal. Because the serdes uses a technology such as 16 nm, a problem that an input common-mode voltage cannot be very wide is caused. The function of the buffer is simple and can be implemented by using a process that has a good tolerance capability for a common-mode level of a signal to isolate damage caused by the common-mode level to a subsequent serdes input port. The buffer provided in this embodiment of this application can resolve the problem that the common-mode voltage is excessively high after a direct-current coupling of the electrical signal output by the optical module.

In a possible implementation of the first aspect, the optical module matching apparatus includes a third switch, a first level matching circuit, and a second level matching circuit. The third switch includes the control end. The first control signal controls the third switch to switch to the first level matching circuit so that the optical module matching apparatus is in the first working mode. The input end and the output end are separately connected to two ends of the first level matching circuit. The second control signal controls the third switch to switch to the second level matching circuit so that the optical module matching apparatus is in the second working mode. The input end and the output end are separately connected to two ends of the second level matching circuit. The first level matching circuit is configured to output the first serial signal, and the second level matching circuit is configured to output the second serial signal.

In this embodiment of this application, the optical module matching apparatus may switch, by using the third switch, a signal output by the optical module to a different level matching circuit so that a device bandwidth performance of the third switch meets a high-frequency switching requirement. When a level type of the signal output by the optical module is the CML level, the first level matching circuit is in the CML alternating-current coupling manner. When the level type of the signal output by the optical module is the LVPECL level, the second level matching circuit is in the LVPECL coupling manner. Different serial-to-parallel conversion apparatuses may be separately connected to a PON MAC module so that the PON MAC module uses different serdes input ports when the optical module outputs signals of different levels.

In a possible implementation of the first aspect, the first level matching circuit includes two transmission lines. The first control signal controls the third switch to switch to the first level matching circuit, and the input end and the output end are separately connected to two ends of the transmission line.

In a possible implementation of the first aspect, the second level matching circuit includes a sixth resistor, a seventh resistor, and two transmission lines. The first control signal controls the third switch to switch to the second level matching circuit. The input end and the output end are separately connected to two ends of the transmission line. An intermediate point between the sixth resistor and the seventh resistor that are connected in series is connected to a ground point.

In a possible implementation of the first aspect, an eighth resistor and a third capacitor are connected in series on the transmission line respectively, where the eighth resistor is configured to attenuate a swing of the first serial signal or a swing of the second serial signal, and the third capacitor is configured to isolate a direct current signal. To reduce signal reflection caused by the optical module matching apparatus, the eighth resistor can be connected in serial to the transmission line to optimize signal reflection close to the output side. In addition, the swing in LVPECL mode may be reduced, to adapt to a swing requirement of the serdes input port. In addition, in this embodiment of this application, the third capacitor is connected in series to the transmission line to isolate the direct current signal so that the alternating-current signal can be transmitted to the serial-to-parallel conversion apparatus.

In a possible implementation of the first aspect, the control apparatus is further configured to: read an optical module identification code from an optical module, output the first control signal when the optical module identification code indicates the first optical module, and output the second control signal when the optical module identification code indicates the second optical module. In this embodiment of this application, each optical module in the optical communications apparatus has a corresponding optical module identifier, where the optical module identifier may be a type identifier of the optical module. For example, the processor is connected to a register of the optical module through an optical module management interface, and the processor reads optical module information through the optical module management interface (for example, an I2C interface) to automatically identify the optical module identifier. If the optical module identification code indicates the first optical module, the processor may output the first control signal, where the first control signal is sent to the optical module matching apparatus by using the control end. If the optical module identification code indicates the second optical module, the processor may output the second control signal, where the second control signal is sent to the optical module matching apparatus by using the control end.

In a possible implementation of the first aspect, the control apparatus is further configured to: receive configuration information input by a management port of the optical communications apparatus, output the first control signal when the configuration information indicates the first optical module, and output the second control signal when the configuration information indicates the second optical module. In this embodiment of this application, an operator of the PON communications system may further deliver the configuration information of the optical module in a manner of a network management system, a command line, or the like based on a type of the optical module actually inserted into the optical communications apparatus so that the processor can automatically identify the optical module identifier. If the configuration information indicates the first optical module, the processor may output the first control signal, where the first control signal is sent to the optical module matching apparatus by using the control end. If the configuration information indicates the second optical module, the processor may output the second control signal, where the second control signal is sent to the optical module matching apparatus by using the control end.

In a possible implementation of the first aspect, a level type of the first electrical signal is a low-voltage positive emitter-coupled logic LVPECL level, and a level type of the second electrical signal is a current mode logic CML level. Alternatively, a level type of the first electrical signal may be a CML level, and a level type of the second electrical signal may be an LVPECL level. The CML level and the LVPECL level have different common-mode levels and swings. Therefore, it may be considered that the CML level and the LVPECL level have different level types. In addition, in this embodiment of this application, the LVPECL level can only be normally output based on an external pull-down resistor, and the CML level can be output not based on the pull-down resistor. In another embodiment, the first electrical signal or the second electrical signal may also be another type of level signal other than the LVPECL level and the CML level. This is not limited herein.

In a possible implementation of the first aspect, the first optical communication protocol and the second optical communication protocol are respectively one of the following plurality of optical communication protocols: a gigabit-capable passive optical network GPON protocol, a 10 gigabit-capable passive optical network XG-PON protocol, 10 gigabit-capable symmetric passive optical network XGS-PON protocol. The first optical communication protocol and the second optical communication protocol are two different protocols.

In a possible implementation of the first aspect, the control apparatus is a processor or a control circuit. In this embodiment of this application, the control apparatus included in the optical communications apparatus may be specifically the processor or the control circuit, provided that different control signals can be output to the control end.

In a possible implementation of the first aspect, the optical communications apparatus is a single board or a printed circuit board PCB. The single board may also be referred to as a board or a line card. For example, in subsequent embodiments, the optical communications apparatus may be referred to as an OLT board or an OLT line card for short. In an actual application, a specific shape of the optical communications apparatus may be set based on a specific scenario of the optical communications apparatus. This is not limited herein.

According to a second aspect, an embodiment of this application provides an optical line termination OLT. The OLT includes the optical communications apparatus according to any one of the first aspect or the possible implementations of the first aspect.

In the second aspect of this application, composition modules of the OLT may be alternatively the architecture described in the first aspect and the possible implementations. For details, refer to the descriptions in the first aspect and the possible implementations.

According to a third aspect, an embodiment of this application provides an optical communication processing method. The method includes. When an optical module matching apparatus receives a first control signal output by a control apparatus, the optical module matching apparatus enters a first working mode, the optical module matching apparatus receives a first electrical signal output by a first optical module, and the optical module matching apparatus outputs a first serial signal; or when the optical module matching apparatus receives a second control signal output by the control apparatus, the optical module matching apparatus enters a second working mode, the optical module matching apparatus receives a second electrical signal output by a second optical module, and the optical module matching apparatus outputs a second serial signal. The first electrical signal and the second electrical signal have different level types.

In the embodiment provided in the third aspect of this application, the control apparatus outputs the first control signal to the control end so that the optical module matching apparatus is in the first working mode. The optical module matching apparatus receives the first electrical signal output by the first optical module, and the optical module matching apparatus outputs the first serial signal. The control apparatus outputs the second control signal to the control end so that the optical module matching apparatus is in the second working mode. The optical module matching apparatus receives the second electrical signal output by the second optical module, and the optical module matching apparatus outputs the second serial signal. When the optical module matching apparatus provided in this embodiment of this application inputs different electrical signals, the optical module matching apparatus may output different serial signals. Therefore, the optical module matching apparatus in this embodiment of this application may be configured to connect to different optical modules so that a same optical module matching apparatus can be compatible with different generations of optical modules. When a user does not need to upgrade an optical module or an ONU, the user does not need to upgrade or replace the optical module or the ONU. This reduces costs. In addition, when the user needs to upgrade the optical module and the ONU, the optical module matching apparatus compatible with the different optical modules is used in the optical communications apparatus, and the entire optical communications apparatus does not need to be upgraded. This reduces costs.

In a possible implementation of the third aspect, the optical module matching apparatus is plugged with an optical module; and the method further includes: The control apparatus reads an optical module identification code from the optical module; and when the optical module identification code indicates the first optical module, the control apparatus outputs the first control signal; or when the optical module identification code indicates the second optical module, the control apparatus outputs the second control signal. In this embodiment of this application, each optical module has a corresponding optical module identification code, and the optical module identification code may be a type identifier of the optical module. For example, the control apparatus is connected to a register of the optical module through an optical module management interface, and the control apparatus reads optical module information through the optical module management interface (for example, an I2C interface), to automatically identify the optical module identifier. If the optical module identification code indicates the first optical module, the control apparatus may output the first control signal, and the first control signal is sent to the optical module matching apparatus by using the control end. If the optical module identification code indicates the second optical module, the control apparatus may output the second control signal, and the second control signal is sent to the optical module matching apparatus by using the control end.

In a possible implementation of the third aspect, the optical module matching apparatus is plugged with an optical module: and the method further includes: The control apparatus reads an optical module identification code from the optical module; when the optical module identification code indicates the first optical module, the control apparatus outputs the first control signal; and when the optical module identification code indicates the second optical module, the control apparatus outputs the second control signal. In this embodiment of this application, an operator of the PON communications system may further deliver the configuration information of the optical module in a manner of a network management system, a command line, or the like based on a type of the optical module actually inserted into the optical communications apparatus so that the control apparatus can automatically identify the optical module identifier. If the configuration information indicates the first optical module, the control apparatus may output the first control signal, where the first control signal is sent to the optical module matching apparatus by using the control end. If the configuration information indicates the second optical module, the control apparatus may output the second control signal, where the second control signal is sent to the optical module matching apparatus by using the control end.

According to a fourth aspect, an embodiment of this application provides a computer-readable storage medium. The computer-readable storage medium stores an instruction. When the instruction is run on a computer, the computer is enabled to perform the method according to the third aspect.

According to a fifth aspect, an embodiment of this application provides a computer program product including an instruction. When the computer program product runs on a computer, the computer is enabled to perform the method according to the third aspect.

According to a sixth aspect, an embodiment of this application provides an optical communications apparatus. The optical communications apparatus may include an entity such as an optical line termination or a chip, and the optical communications apparatus includes a control apparatus and a memory. The memory is configured to store an instruction, and the control apparatus is configured to execute the instruction in the memory so that the communications apparatus performs the method according to any one of the first aspect or the second aspect.

According to a seventh aspect, this application provides a chip system. The chip system includes a control apparatus, configured to support an optical communications apparatus in implementing functions in the foregoing aspects, for example, sending or processing data and/or information in the foregoing methods. In a possible design, the chip system further includes a memory, and the memory is configured to store a program instruction and data that are necessary for the optical communications apparatus. The chip system may include a chip, or may include a chip and another discrete component.

DESCRIPTION OF EMBODIMENTS

Embodiments of this application provide an optical communications apparatus, an optical line termination, and an optical communication processing method so that a same optical communications apparatus can be compatible with different generations of optical modules. When a user does not need to upgrade an optical module and an ONU, the optical module and the ONU do not need to be upgraded or replaced. This reduces costs.

The following describes the embodiments of this application with reference to accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in some embodiments of this application. In addition, the terms "include", "contain" and any other variants mean to cover the non-exclusive inclusion so that a process, method, system, product, or device that includes a series of units is not necessarily limited to those units, but may include other units not expressly listed or inherent to such a process, method, system, product, or device.

Figure 1:
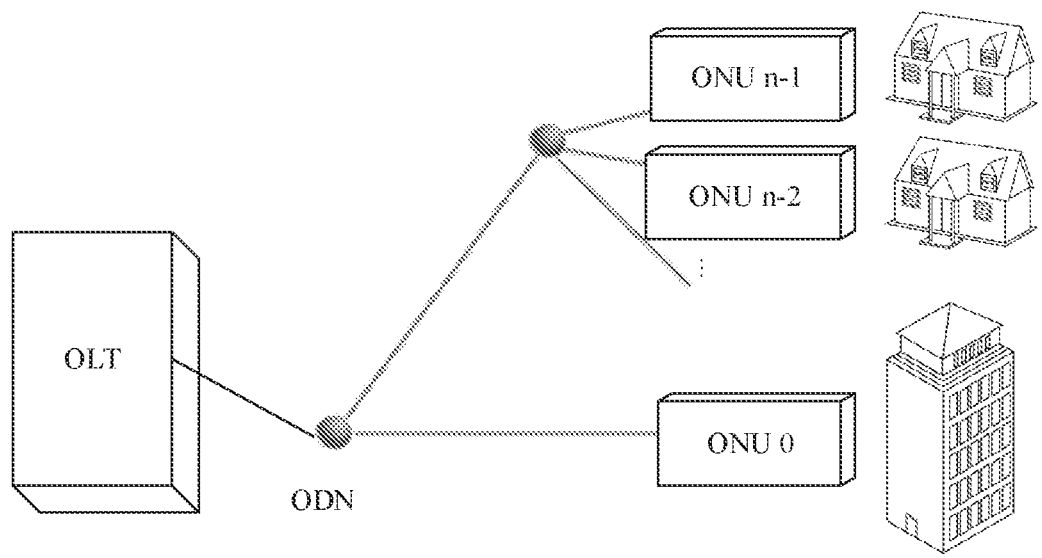
FIG. 1 is a schematic diagram of a networking structure of a PON communications system according to an embodiment of this application.

The technical solutions in the embodiments of this application may be applied to various PON communications systems. As shown in FIG. 1, the PON communications system provided in the embodiments of this application may include an optical line termination (OLT), an optical distribution network (ODN), and n optical network units (ONU). In this embodiment of this application, the optical line termination is separately connected to n optical network units by using the ODN. For example, the n optical network units may be an ONU 0, . . . , an ONU n−2, and an ONU n−1 shown in FIG. 1. The ODN is a passive component. The ODN includes a feeder optical fiber, an optical splitter, and a distribution optical fiber.

The optical line termination provided in this embodiment of this application may include an optical communications apparatus. The optical communications apparatus includes a control apparatus and an optical module matching apparatus. An input end of the optical module matching apparatus may be configured to connect to different optical modules. The optical module may be referred to as an optical transceiver module. In other words, an optical transmitter (briefly referred to as a transmitter or a transmitter) and an optical receiver (briefly referred to as a receiver) that are of a service port of the OLT may be separated and assembled into the single optical transceiver module. In an actual OLT application scenario, users of each service port have different bandwidth requirements, and urgency degrees of upgrading the OLT are also different. This embodiment of this application can meet a requirement that a new generation of OLT can be compatible with a previous generation of optical module. In this way, a previous generation of optical module and ONU can still be used on a port that does not need to upgrade a bandwidth to avoid resource waste.

In this embodiment of this application, the control apparatus included in the optical communications apparatus may be specifically a processor or a control circuit, provided that different control signals can be output to the control end. In addition, the optical module matching apparatus provided in this embodiment of this application may be a circuit, or may be an apparatus combining software and hardware. The control end included in the optical module matching apparatus may be specifically a switch, or may be another interface that can receive the control signal, provided that the control end can, based on the different control signals output by the control apparatus, enable the optical module matching apparatus to be in different working modes, and enable different types of optical modules to correctly output level signals.

Input optical signals in the optical module provided in this embodiment of this application may be generated according to different optical communication protocols. Specifically, the input optical signals in the optical module may be generated by ONUs that comply with the different optical communication protocols. The optical communication protocols may include at least one of the following protocols: a gigabit-capable passive optical network (GPON) protocol, a 10 gigabit-capable passive optical network (XG-PON) protocol, and a 10 gigabit-capable symmetric passive optical network (XGS-PON) protocol.

In some embodiments of this application, the optical communications apparatus may specifically include a single board, or a printed circuit board (PCB). The single board may also be referred to as a board or a line card. For example, in subsequent embodiments, the optical communications apparatus may be referred to as an OLT board or an OLT line card for short. In an actual application, a specific shape of the optical communications apparatus may be set based on a specific scenario of the optical communications apparatus. This is not limited herein.

Figure 2:
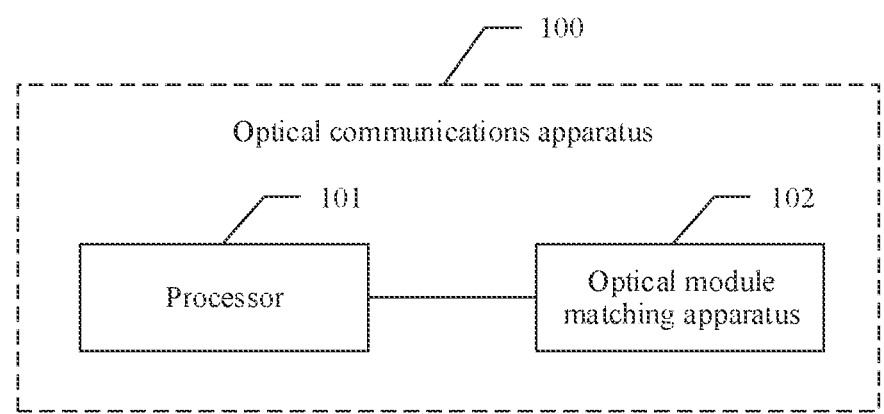
FIG. 2 is a schematic diagram of a composition structure of an optical communications apparatus according to an embodiment of this application.

In some embodiments of this application, the control apparatus included in the optical communications apparatus may be specifically a processor or a control circuit. In subsequent embodiments, an example in which the control apparatus is specifically the processor is used for description. As shown in FIG. 2, an embodiment of this application provides an optical communications apparatus so that a same optical communications apparatus can be compatible with different generations of optical modules. When a user does not need to upgrade an optical module and an ONU, the optical module and the ONU do not need to be upgraded or replaced. In addition, when the user needs to replace the optical module and the ONU, the optical communications apparatus does not need to be upgraded or replaced. The optical communications apparatus 100 shown in FIG. 2 may include a processor 101 and an optical module matching apparatus 102.

The processor 101 is connected to a control end of the optical module matching apparatus 102.

The processor 101 is configured to output a first control signal to the control end so that the optical module matching apparatus 102 is in a first working mode. An input end of the optical module matching apparatus 102 is configured to connect to a first optical module, and receive a first electrical signal output by the first optical module, and an output end of the optical module matching apparatus 102 outputs a first serial signal.

The processor 101 is further configured to output a second control signal to the control end so that the optical module matching apparatus 102 is in a second working mode. The input end of the optical module matching apparatus 102 is further configured to connect to a second optical module, and receive a second electrical signal output by the second optical module, and the output end of the optical module matching apparatus 102 outputs a second serial signal.

The first electrical signal and the second electrical signal have different level types.

In this embodiment of this application, the processor 101 may be an integrated circuit chip and has a signal processing capability. In an implementation process, the processor 101 may output the first control signal, or may output the second control signal. The first control signal and the second control signal may be implemented by using an integrated logic circuit of hardware in the processor 101 or an instruction in a form of software. The processor 101 may be a general-purpose processor, a digital signal processor (DSP), an application-specific integrated circuit (ASIC), a field-programmable gate array (FPGA) or another programmable logical device, a discrete gate or transistor logic device, or a discrete hardware component. In this embodiment of this application, the processor 101 in the optical communications apparatus 100 may be a microprocessor, or the processor may be any conventional processor, or the like.

In this embodiment of this application, the optical module may include a transmitter and a receiver, and the optical module may be connected to the processor 101. For example, the processor may communicate with a microcontroller unit (MCU) inside the optical module by using an I2C interface, read optical module information, including static information such as an optical module type and a serial number (SN), and monitoring information such as a voltage, temperature, launched optical power, and received optical power that are of the optical module. For another example, the processor may control, by sending an enable signal, whether the transmitter of the optical module works. For another example, the processor may obtain working statuses of the transmitter and the receiver of the optical module through the I2C interface and an indication signal such as a transmitter fault TX_FAULT indication.

Figure 3:
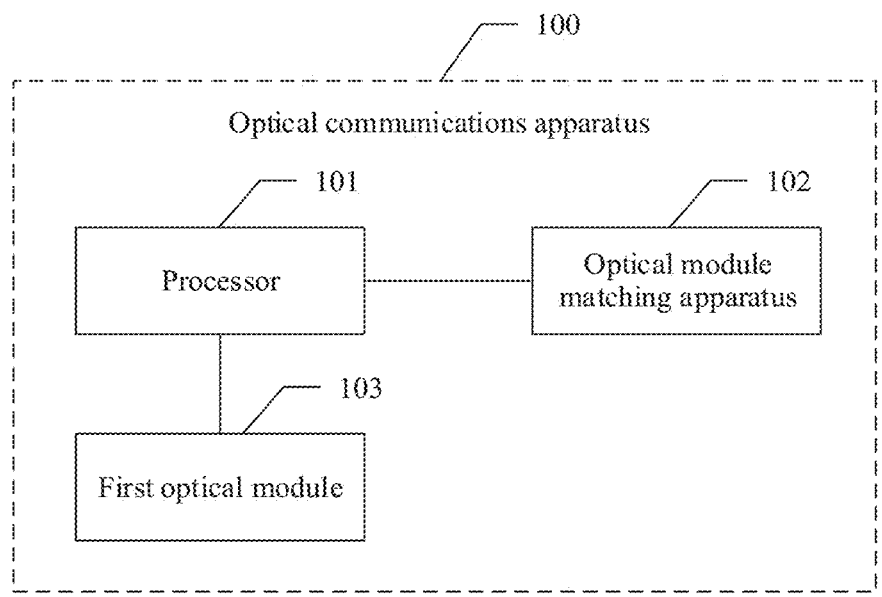
FIG. 3 is a schematic diagram of a composition structure of another optical communications apparatus according to an embodiment of this application.
Figure 4:
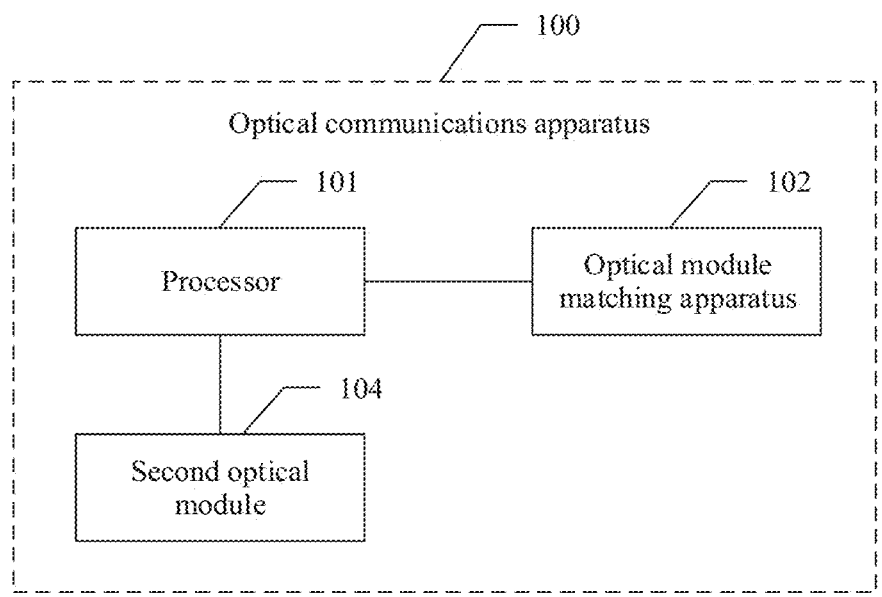
FIG. 4 is a schematic diagram of a composition structure of another optical communications apparatus according to an embodiment of this application.

In some embodiments of this application, as shown in FIG. 3, the optical communications apparatus 100 may further include a first optical module 103. The first optical module 103 is connected to the processor 101. As shown in FIG. 4, the optical communications apparatus 100 may further include a second optical module 104. The second optical module 104 is connected to the processor 101. It should be noted that the first optical module 103 and the second optical module 104 may be different optical modules. For example, the first optical module 103 and the second optical module 104 generate different level types.

In this embodiment of this application, the first optical module 103 may output a first electrical signal, and the second optical module 104 may output a second electrical signal. The first electrical signal and the second electrical signal have different level types. That the level types of the two electrical signals are different may specifically be that common-mode levels of the two electrical signals are different, or swings of the two electrical signals are different. The swing is an amplitude of a swing of an electrical signal.

In some embodiments of this application, a level type of the first electrical signal may be a low-voltage positive emitter-coupled logic (LVPECL) level. A level type of the second electrical signal may be a current mode logic (CML) level. Alternatively, a level type of the first electrical signal may be a CML level, and a level type of the second electrical signal may be an LVPECL level. The CML level and the LVPECL level have different common-mode levels and swings. Therefore, it may be considered that the CML level and the LVPECL level have different level types. In addition, in this embodiment of this application, the LVPECL level can only be normally output based on an external pull-down resistor, and the CML level can be output not based on the pull-down resistor. In another embodiment, the first electrical signal or the second electrical signal may also be another type of level signal other than the LVPECL level and the CML level. This is not limited herein.

In some embodiments of this application, the first electrical signal and the second electrical signal may have different serial data rates. The first optical module 103 and the second optical module 104 separately output electrical signals at different serial data rates. For example, when the first optical module is a GPON OLT optical module, a serial rate of an output electrical signal is 1.24416 Gbps, and when the second optical module is an XG-PON OLT optical module, a serial rate of an output electrical signal is 2.48832 Gbps. For another example, when the first optical module is the XG-PON OLT optical module, a serial rate of an output electrical signal is 2.48832 Gbps, and when the second optical module is an XGS-PON OLT optical module, a serial rate of an output electrical signal is 9.95328 Gbps. In an actual application, a serial data rate of an output electrical signal may be determined based on a type of the optical module.

Figure 5:
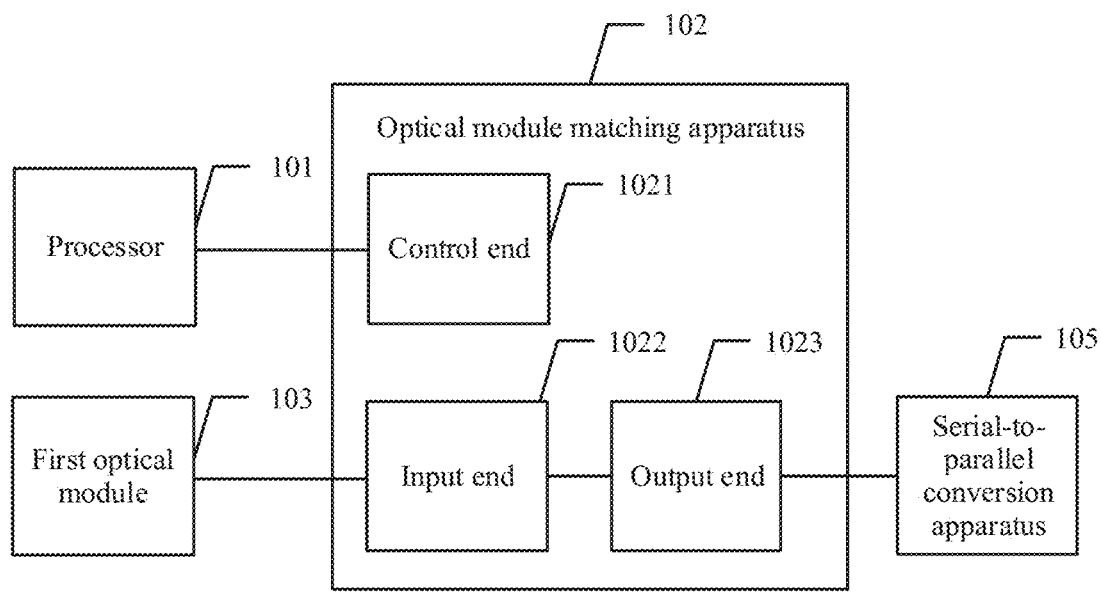
FIG. 5 is a schematic diagram of a composition structure of an optical module matching apparatus according to an embodiment of this application.

In this embodiment of this application, as shown in FIG. 5, the optical module matching apparatus 102 has at least three ports: a control end 1021, an input end 1022, and an output end 1023. The processor 101 is connected to the control end 1021 of the optical module matching apparatus 102, and the processor 101 may input different control signals to the optical module matching apparatus 102 by using the control end 1021 so that the optical module matching apparatus 102 enters different working modes. The optical module matching apparatus 102 has a plurality of working modes based on different input control signals. The working mode refers to a working state which the optical module matching apparatus needs to enter to enable the optical module to correctly process an electrical signal. The working mode is further used to enable the optical module matching apparatus to output a correct serial signal. For example, to enable the optical module to correctly process a first electrical signal and enable the optical module matching apparatus to output a correct first serial signal, the optical module matching apparatus needs to enter a first working mode. For another example, to enable the optical module to correctly process a second electrical signal and enable the optical module matching apparatus to output a correct second serial signal, the optical module matching apparatus needs to enter a second working mode. In this embodiment of this application, working procedures performed by the optical module matching apparatus 102 in the different working modes may be determined based on a specific scenario. This is not limited herein.

It should be noted that, the processor 101 may input different control signals to the optical module matching apparatus 102 by using the control end 1021, and the optical module matching apparatus 102 needs to enter the different working modes based on a control function of the processor, to implement communication control between the processor 101 and different optical modules.

In this embodiment of this application, the input end of the optical module matching apparatus 102 is configured to connect to the first optical module. The optical module matching apparatus 102 is in the first working mode and receives the first electrical signal output by the first optical module. The output end of the optical module matching apparatus 102 outputs the first serial signal. The input end of the optical module matching apparatus 102 is further configured to connect to a second optical module. The optical module matching apparatus 102 is in the second working mode, and receives the second electrical signal output by the second optical module. The output end of the optical module matching apparatus 102 outputs the second serial signal. For example, a type of an electrical signal output by the GPON OLT optical module is the LVPECL level, and a type of an electrical signal output by the XG-PON OLT optical module is the CML level. When the optical module used by the user is the GPON OLT optical module, the GPON OLT optical module is connected to the input end of the optical module matching apparatus 102. In this case, the optical module matching apparatus 102 is in the first working mode so that the GPON OLT optical module correctly outputs the signal of an LVPECL level, and the optical module matching apparatus 102 outputs an electrical signal at a rate corresponding to a GPON communications system. When the user needs to upgrade to the XG-PON, only the original GPON OLT optical module on the OLT needs to be replaced with the XG-PON OLT optical module. The optical module matching apparatus 102 switches the first working mode to the second working mode so that the XG-PON OLT optical module correctly outputs the CML level, and the optical module matching apparatus 102 outputs an electrical signal at a rate corresponding to an XG-PON communications system. Therefore, in this embodiment of this application, a same optical module matching apparatus 102 may be connected to different optical modules. In a scenario in which the optical modules need to be upgraded or replaced, the optical communications apparatus does not need to be replaced. This reduces upgrade costs.

In the embodiment of the application, in an actual OLT application scenario, users of each service port have different bandwidth requirements, and urgency degrees of upgrading the OLT are also different. For example, when an operator needs to upgrade the OLT to the latest generation, according to the prior art, the operator needs to upgrade, to the latest generation, an optical module and an ONU that are connected to the OLT. As a result, the original optical module and ONU need to be discarded. This causes resource waste. However, in this embodiment of this application, a requirement that a new generation of OLT can be compatible with a previous generation of optical module can be met so that a port that temporarily does not need to upgrade a bandwidth can continue to use the previous generation of optical module and the ONU, to avoid the resource waste. For example, the type of the electrical signal output by the GPON OLT optical module is the LVPECL level, and the type of the electrical signal output by the XG-PON OLT optical module is the CML level. When the operator needs to upgrade the GPON OLT to the XG-PON OLT, according to the prior art, all GPON OLT optical modules must be upgraded to XG-PON OLT optical modules. However, if the user currently does not need to upgrade the bandwidth, according to this embodiment of this application, the GPON OLT optical modules do not need to be upgraded to the XG-PON OLT optical modules, and the original GPON OLT optical modules are still used in the XG-PON communications system. Because the XG-PON OLT provided in this embodiment of this application may include the optical communications apparatus, the optical module matching apparatus in the optical communications apparatus may enable the GPON OLT optical module to correctly output the signal of an LVPECL level, and the optical module matching apparatus outputs an electrical signal at a rate corresponding to the XG-PON communications system. Therefore, in this embodiment of this application, the same optical module matching apparatus may be connected to different optical modules. When the OLT needs to be upgraded or replaced, the optical modules and ONUs do not need to be replaced. This reduces upgrade costs.

In some embodiments of this application, the optical communications apparatus 100 may further include a serial-to-parallel conversion (serializer/deserializer, serdes) apparatus 105. In FIG. 5, the optical module matching apparatus 102 has at least three ports: a control end 1021, an input end 1022, and an output end 1023. The processor 101 is connected to the control end 1021 of the optical module matching apparatus 102, the first optical module 103 is connected to the input end 1022, and the serial-to-parallel conversion apparatus 105 is connected to the output end 1023. The output end of the optical module matching apparatus 102 may output the first serial signal, the optical module matching apparatus 102 may output the first serial signal to the serial-to-parallel conversion apparatus 105, and the serial-to-parallel conversion apparatus 105 performs serial-to-parallel conversion on the first serial signal.

Figure 6:
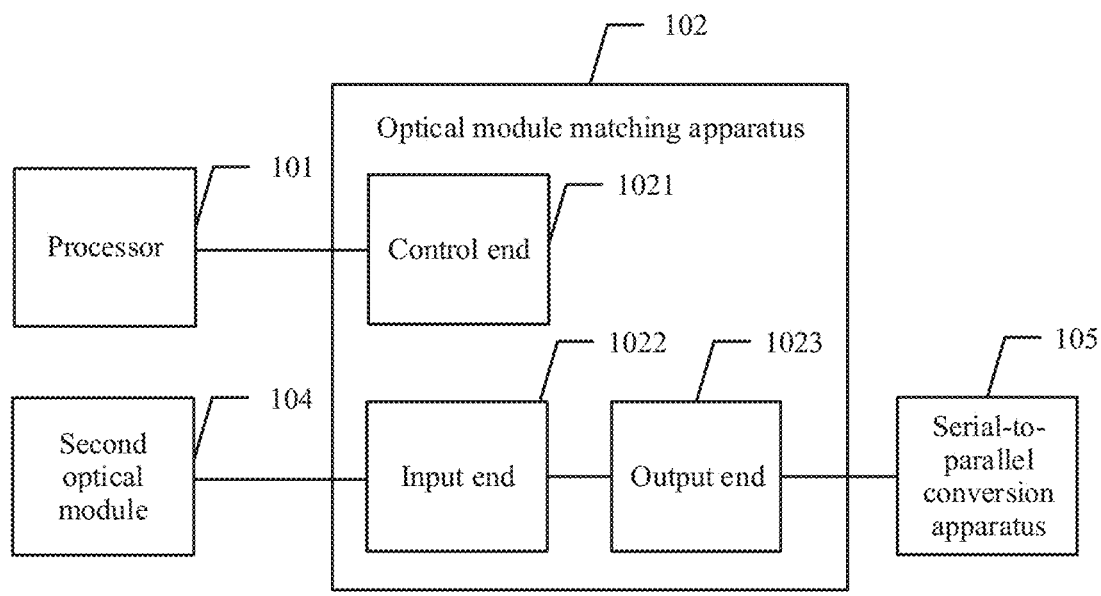
FIG. 6 is a schematic diagram of a composition structure of another optical module matching apparatus according to an embodiment of this application.

In some embodiments of this application, as shown in FIG. 6, the optical module matching apparatus 102 has at least three ports: the control end 1021, the input end 1022, and the output end 1023. The optical communications apparatus 100 may further include the serial-to-parallel conversion apparatus 105, the processor 101 is connected to the control end 1021 of the optical module matching apparatus 102, the second optical module 104 is connected to the input end 1022, and the serial-to-parallel conversion apparatus 105 is connected to the output end 1023. The output end 1023 of the optical module matching apparatus 102 may output the second serial signal, the optical module matching apparatus 102 may output the second serial signal to the serial-to-parallel conversion apparatus 105, and the serial-to-parallel conversion apparatus 105 performs serial-to-parallel conversion on the second serial signal.

It can be learned with reference to the embodiment in FIG. 5 or FIG. 6 that, in this embodiment of this application, the optical module matching apparatus 102 may output the first serial signal or output the second serial signal by using the output end. Because the serial-to-parallel conversion apparatus 105 is connected to the output end 1023, the optical module matching apparatus 102 may output the first serial signal or the second serial signal to the serial-to-parallel conversion apparatus 105 by using the output end 1023, and the serial-to-parallel conversion apparatus 105 may perform serial-to-parallel conversion on the first serial signal or the second serial signal. Therefore, in this embodiment of this application, the optical module matching apparatus 102 may output different serial signals in different control modes so that the optical module matching apparatus 102 implements serial signal conversion on the different electrical signals when different optical modules output different electrical signals. In this way, the serial-to-parallel conversion apparatus 105 can obtain serial signals corresponding to the different electrical signals.

Figure 7:
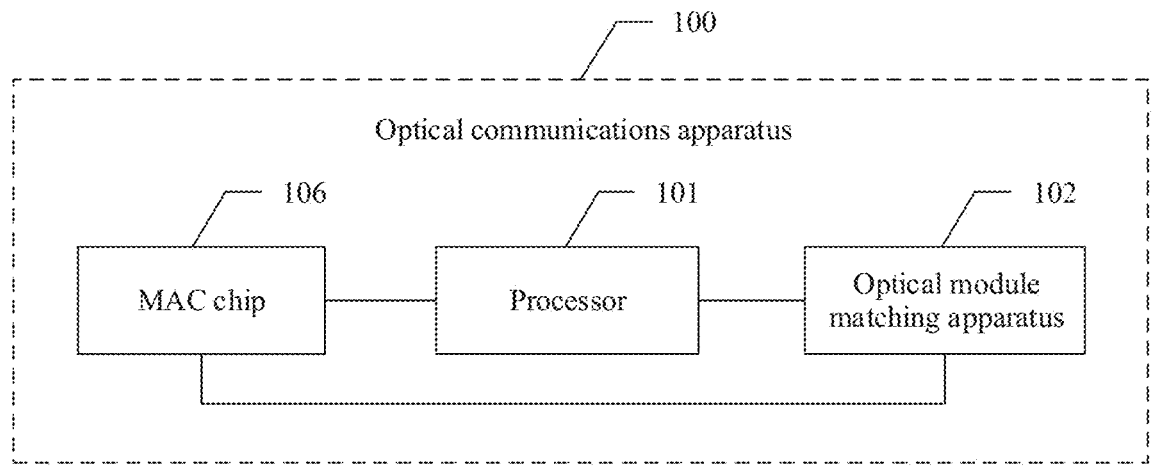
FIG. 7 is a schematic diagram of a composition structure of another optical communications apparatus according to an embodiment of this application.

In some embodiments of this application, as shown in FIG. 7, the optical communications apparatus 100 provided in this embodiment of this application may further include a media access control (MAC) chip 106.

The processor 101 is connected to the MAC chip 106, the MAC chip 106 supports a first optical communication protocol and a second optical communication protocol, and the output end of the optical module matching apparatus 102 is connected to the MAC chip.

When the first serial signal is output to the MAC chip 106, the MAC chip 106 performs signal parsing according to the first optical communication protocol.

When the second serial signal is output to the MAC chip 106, the MAC chip 106 performs signal parsing according to the second optical communication protocol.

The output end of the optical module matching apparatus 102 may be connected to the MAC chip 106. The optical module matching apparatus 102 described herein may be directly connected to the MAC chip 106 or indirectly connected to the MAC chip 106. For example, the MAC chip 106 has an input end, and the input end of the MAC chip 106 is directly connected to the output end of the optical module matching apparatus 102. For another example, a serial-to-parallel conversion apparatus is connected between the MAC chip 106 and the optical module matching apparatus 102. The serial-to-parallel conversion apparatus may be specifically a serdes apparatus. A serial signal output by the optical module matching apparatus 102 is converted into a parallel signal by the serial-to-parallel conversion apparatus, and then the parallel signal may be input to the MAC chip 106. For another example, the serial-to-parallel conversion apparatus may be integrated inside the MAC chip. After the MAC chip obtains the serial signal from the optical module matching apparatus 102, the serial-to-parallel conversion apparatus integrated inside the MAC chip 106 converts the serial signal into the parallel signal.

It should be noted that, in this embodiment of this application, the MAC chip 106 supports the first optical communication protocol and the second optical communication protocol in a plurality of implementations. For example, the MAC chip 106 may store program code of the first optical communication protocol and program code of the second optical communication protocol. When the MAC chip 106 needs to use a specific optical communication protocol, the MAC chip 106 may obtain program code of the optical communication protocol. For another example, the MAC chip may include a first MAC module and a second MAC module, where the first MAC module may support the first optical communication protocol, and the second MAC module may support the second optical communication protocol. For another example, there may be at least two MAC chips, and each MAC chip supports one optical communication protocol. In an actual application, a quantity of MAC chips and a supported optical communication protocol may be flexibly configured based on a configuration requirement of the MAC chip in the optical communications apparatus.

In some embodiments of this application, the optical communications apparatus further includes at least one of the following modules: the first optical module and the second optical module. FIG. 3 and FIG. 4 show examples in which the optical communications apparatus may include one optical module. It is not limited that a plurality of optical modules may be further disposed in the optical communications apparatus. For example, in addition to the first optical module and the second optical module, the optical communications apparatus provided in this embodiment of this application may further include a third optical module, a fourth optical module, and the like. Each optical module corresponds to a serial data rate of an electrical signal. In addition, when the optical communications apparatus in this embodiment of this application includes N optical modules, the processor may output N control signals, and the processor may control N optical module matching apparatuses to separately enter corresponding working modes, to output N serial signals.

In some embodiments of this application, the first optical communication protocol and the second optical communication protocol are respectively one of the following plurality of optical communication protocols: a GPON protocol, an XG-PON protocol, and an XGS-PON protocol. The first optical communication protocol and the second optical communication protocol are two different protocols. The MAC chip may support the first optical communication protocol and the second optical communication protocol. The two optical communication protocols are different optical communication protocols. For example, in an actual application, the plurality of optical communication protocols include the GPON protocol, the XG-PON protocol, and the XGS-PON protocol. It is not limited that the optical communication protocol in this embodiment of this application is not limited to the foregoing protocol. For example, the optical communication protocol may also include an ethernet passive optical network (EPON) protocol and a 10 gigabit Ethernet passive optical network (10G-EPON) protocol.

In some embodiments of this application, optical signals separately generated according to the first optical communication protocol and the second optical communication protocol have different serial data rates. For example, when the first optical communication protocol is the GPON OLT optical communication protocol, the serial rate of the electrical signal is 1.24416 Gbps, and when the second optical communication protocol is the XG-PON OLT optical communication protocol, the serial rate of the electrical signal is 2.48832 Gbps. For another example, when the first optical communication protocol is the XG-PON OLT optical communication protocol, the serial rate of the electrical signal is 2.48832 Gbps, and when the second optical communication protocol is the XGS-PON OLT optical communication protocol, the serial rate of the electrical signal is 9.95328 Gbps. In the actual application, a serial data rate of an output electrical signal can be determined according to a type of the optical communication protocol.

In some embodiments of this application, the processor is further configured to: read an optical module identification code from the optical module, output a first control signal when the optical module identification code indicates the first optical module, and output a second control signal when the optical module identification code indicates the second optical module.

In this embodiment of this application, each optical module in the optical communications apparatus has a corresponding optical module identifier, and the optical module identifier may be a type identifier of the optical module. For example, the processor is connected to a register of the optical module through an optical module management interface, and the processor reads optical module information through the optical module management interface (for example, an I2C interface), to automatically identify the optical module identifier. If the optical module identification code indicates the first optical module, the processor may output the first control signal, and the first control signal is sent to the optical module matching apparatus by using the control end. If the optical module identification code indicates the second optical module, the processor may output the second control signal, and the second control signal is sent to the optical module matching apparatus by using the control end.

In some embodiments of this application, the processor is further configured to: receive configuration information input by the management port of the optical communications apparatus, output the first control signal when the configuration information indicates the first optical module, and output the second control signal when the configuration information indicates the second optical module.

In this embodiment of this application, an operator of the PON communications system may further deliver the configuration information of the optical module in a manner of a network management system, a command line, or the like based on a type of the optical module actually inserted into the optical communications apparatus so that the processor can automatically identify the optical module identifier. If the configuration information indicates the first optical module, the processor may output the first control signal, and the first control signal is sent to the optical module matching apparatus by using the control end. If the configuration information indicates the second optical module, the processor may output the second control signal, and the second control signal is sent to the optical module matching apparatus by using the control end.

It can be learned from the example description of the foregoing embodiment that the optical communications apparatus includes the control apparatus and the optical module matching apparatus. The control apparatus is connected to the control end of the optical module matching apparatus. The control apparatus is configured to output the first control signal to the control end so that the optical module matching apparatus is in the first working mode. The input end of the optical module matching apparatus is configured to connect to the first optical module, and receive the first electrical signal output by the first optical module. The output end of the optical module matching apparatus outputs the first serial signal. The control apparatus is further configured to output the second control signal to the control end so that the optical module matching apparatus is in the second working mode. The input end of the optical module matching apparatus is further configured to connect to the second optical module, and receive the second electrical signal output by the second optical module. The output end of the optical module matching apparatus outputs the second serial signal. The first electrical signal and the second electrical signal have different level types. When the input end of the optical communications apparatus provided in this embodiment of this application inputs different electrical signals, the output end of the optical communications apparatus may output different serial signals. Therefore, the optical module matching apparatus in this embodiment of this application may be configured to connect to different optical modules, and a same optical communications apparatus can be compatible with different generations of optical modules. When a user does not need to upgrade an optical module and an ONU, the optical module and the ONU do not need to be upgraded or replaced. This reduces costs. In addition, when the user needs to upgrade the optical module and the ONU, the optical module matching apparatus compatible with the different optical modules is used in the optical communications apparatus, and the entire optical communications apparatus does not need to be upgraded. This reduces costs.

To better understand and implement the foregoing solutions in the embodiments of this application, the following uses a corresponding application scenario as an example for specific description.

To resolve a prior-art problem of resource waste caused by that an optical module needs to be replaced because an OLT cannot be compatible with different generations of optical modules, an embodiment of this application provides an optical communications apparatus. The following uses an example in which the optical communications apparatus includes an OLT board. In this embodiment of this application, a previous generation of optical module is repeatedly used on a new generation of OLT board, and a reuse compatibility solution for the previous generation of optical module with access performance is provided. The OLT board provided in the embodiments of this application may be referred to as an OLT line card. The OLT board provided in this embodiment of this application may include the MAC chip, a CPU, the optical module, and the optical module matching apparatus. The MAC chip may be referred to as a PON MAC module, and the MAC chip may be a module disposed on the OLT board. The optical module matching apparatus provided in this embodiment of this application includes the control end, the input end, and the output end. The CPU is connected to the optical module matching apparatus by using the control end.

Figure 8:
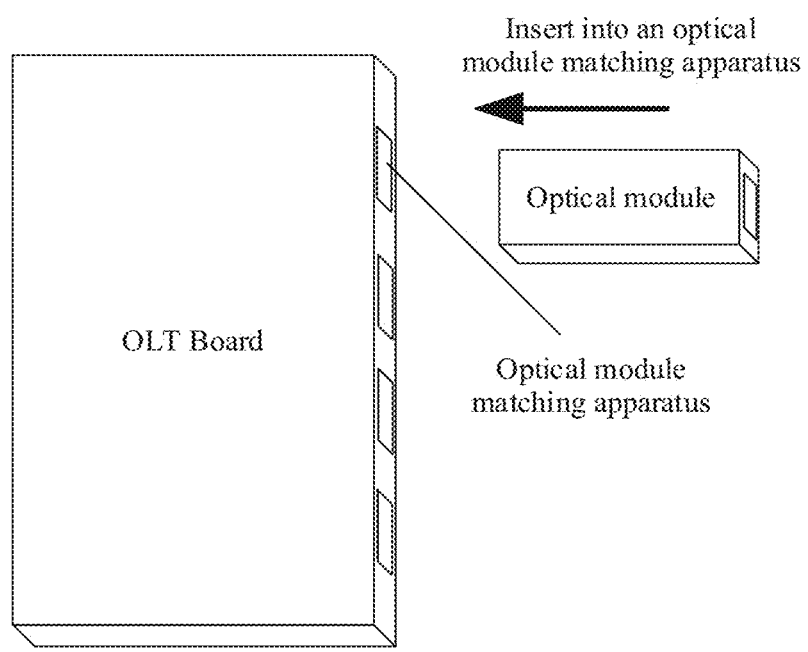
FIG. 8 is a schematic diagram of a connection between an optical module matching apparatus in an OLT board and an optical module according to an embodiment of this application.

FIG. 8 is a schematic diagram of a connection between an optical module matching apparatus in an OLT board and an optical module according to an embodiment of this application. An input end of the optical module matching apparatus is connected to the optical module. For example, the optical module is inserted into the optical module matching apparatus. The input end of the optical module matching apparatus may include a panel port and an optical module cage. The optical module may be inserted into the optical module matching apparatus by using the panel port and the optical module cage. It should be noted that the MAC chip and the CPU belong to an internal composition structure of the OLT board, and are not illustrated in FIG. 8.

Figure 9:
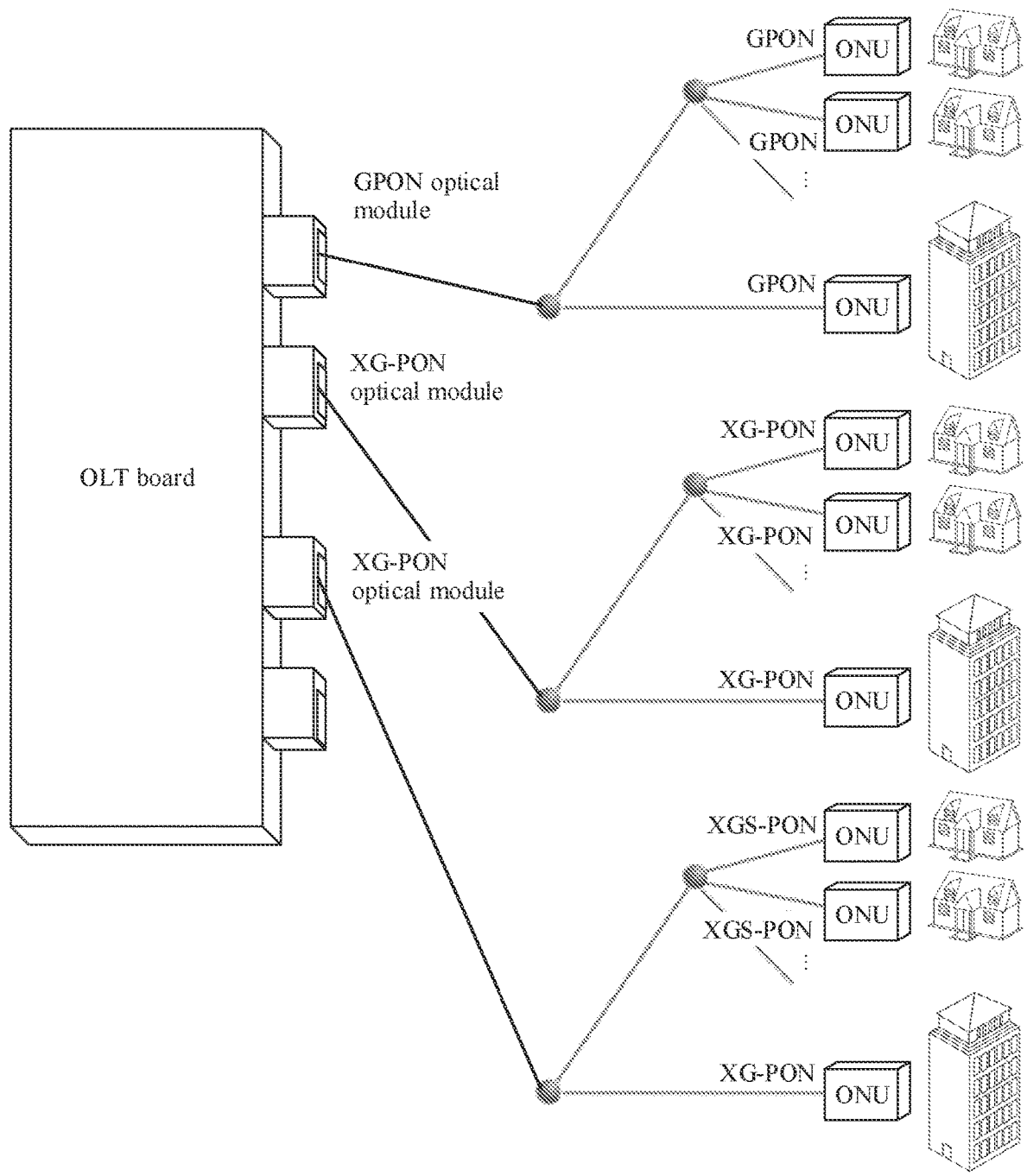
FIG. 9 is a schematic diagram of a networking structure of another PON communications system according to an embodiment of this application.

FIG. 9 is a schematic diagram of a composition structure of a PON communications system according to an embodiment of this application. The PON communications system may include an OLT board, and the OLT board may include a plurality of optical module matching apparatuses so that one optical module may be inserted into each optical module matching apparatus, and different optical modules may be inserted into different optical module matching apparatuses. For example, a GPON OLT optical module, an XG-PON OLT optical module, and an XGS-PON optical module may be inserted into the OLT board at the same time. The GPON OLT optical module may be connected to a GPON ONU through an ODN, the XG-PON OLT optical module may be connected to an XG-PON ONU through the ODN, and the XGS-PON optical module can be connected to an XGS-PON ONU through the ODN. In the PON communications system provided in this embodiment of this application, the different optical modules may be inserted into the OLT board. Therefore, in a scenario in which the optical module needs to be upgraded, the OLT board does not need to be replaced. This reduces manufacturing costs of the OLT. In addition, in this embodiment of this application, the OLT board may be compatible with the different optical modules. When the OLT board needs to be upgraded, an old version of the optical module may still be used, to avoid upgrading the optical module and reduce upgrade costs of the optical module.

The following describes in detail the optical module in this embodiment of this application. The optical module may be the latest generation of optical module supported by a current board, or may be an old version of the optical module that needs to be compatible. The OLT in the PON communications system may be an XGS-PON OLT line card, and may be compatible with the GPON OLT optical module and the XG-PON OLT optical module. The GPON OLT optical module and XG-PON OLT optical module are the old version of optical modules that need to be compatible. In this embodiment of this application, a structure and pin definition of the latest generation of the optical module are consistent with or compatible with those of the old version of the optical module. In other words, except that upstream and downstream rates are different, other differences may be implemented through the optical module matching apparatus.

For example, structures of the GPON OLT optical module, the XG-PON OLT optical module, and the XGS-PON OLT optical module in this embodiment of this application are compatible with each other. All optical modules are packaged in a small form-factor pluggable (SFP) manner. In this embodiment of this application, optical module matching apparatuses connected to different optical modules have basically same mechanical parts. For example, the optical module matching apparatus may include a panel port, an optical module cage, a radiator, and a connector. In this embodiment of this application, it can be ensured that the XGS-PON OLT optical module can be inserted into the XGS-PON OLT board, and the GPON OLT optical module and the XG-PON OLT optical module can be inserted into the XGS-PON OLT board.

The GPON OLT optical module, the XG-PON OLT optical module, and the XGS-PON OLT optical module in this embodiment of this application have basically same pin definitions. For example, pin assignment of power supplies is the same. Pin assignment of management interfaces (including I2C interfaces) is the same. Pin assignment of a control signal and a detection signal (including a reset signal, an optical signal detection (SD) indication, a received optical signal strength detection triggering (RSSI_Trig) signal, an optical module transmitter fault (TX_FAULT) indication, optical module transmission enabling (TX_Disable) control, in-position detection, and the like) is the same. Pin assignment of serdes signals input to transmitters is the same. Pin assignment of serdes signals output by receivers is the same.

However, in this embodiment of this application, assignment of all pins is not required to be exactly the same, provided that a difference can be adapted by using the optical module matching apparatus. For example, the following uses an in-position signal design as an example. The in-position signal is an indication signal indicating whether the optical module is in position. That the optical module is in position indicates that the optical module is reliably connected to the OLT board. Generally, the optical module is grounded. Pull-up input is performed on the OLT board. The in-position signal is an input signal on the OLT single board, and is pulled up to an optical module power supply (generally 3.3 V). In this way, when the optical module is not inserted, the in-position signal is pulled up to a high level. After the optical module is inserted, the in-position signal is low. After the optical module is in position, the pin is pulled down. The OLT board can obtain, by detecting a level status of the input in-position signal, whether the optical module is in position. In this embodiment of this application, there may be more than three grounded pins on the optical module. In this case, different in-position pins may be assigned to different optical modules, provided that impact on interface signal integrity is fully considered. In addition, a level type of an output serdes electrical signal of a receiver of the GPON OLT optical module is different from that of the XG-PON OLT optical module and that of XGS-PON OLT optical module. A level type of an input electrical signal of the GPON OLT optical module is the LVPECL level, but a level type of an input electrical signal of the XG-PON OLT optical module and a level type of an input electrical signal of the XGS-PON OLT optical module are CML levels. The optical module matching apparatus needs to adapt to the difference between the two levels. For example, a matching circuit for matching two levels may be disposed in the optical module matching apparatus.

The following describes, by using an example, the optical module matching apparatus provided in this embodiment of this application. The optical module matching apparatus is configured to cooperate with different optical modules and is compatible with differences between the different optical modules. Implementation difficulty of the optical module matching apparatus may be reduced by using a same or similar structure, pin, and level definition. For example, the optical modules have same dimensions or are compatible with each other, and a structure of the OLT board is compatible with the different optical modules. Through same or similar compatible pin assignment of power supplies, control signals, and serdes signals, direct compatibility or compatibility with only a few changes is implemented on the electrical interface of the optical module.

It should be noted that, in this embodiment of this application, different generations of optical modules have different upstream rates and downstream rates, rates of serdes electrical signals are different, and signal adjustment manners of serdes electrical signals are also different. The differences are not adapted or eliminated by the optical module matching apparatus, instead, the PON MAC module provides support for different PON protocols.

In this embodiment of this application, the different generations of optical modules have different types of received electrical signal levels. For example, a level type of a received electrical signal of the GPON OLT optical module is the LVPECL level, but a level type of a received electrical signal of the XG-PON OLT optical module and a level type of a received electrical signal of the XGS-PON OLT optical module are CML levels. Different level signals have different matching modes. If the different matching signals are incompatible, the optical module matching apparatus must be able to adapt to the differences. The optical module matching apparatus in this embodiment of this application may include a matching circuit which is compatible with LVPECL level and CML level. The matching circuit has a compatibility function. For example, the circuit may support the LVPECL level and the CML level.

In this embodiment of this application, the optical module matching apparatus may be an optical module peripheral apparatus and a matching circuit that are modified on the OLT board. The optical module peripheral apparatus includes a panel port, an optical module cage, a heat sink, a connector, and the like. The panel port is used to insert the optical module from an opening. The optical module cage is a container of the optical module. The heat sink is used to enhance heat dissipation of the optical module. The heat sink may not be required for a low-power optical module. The connector is used for electrical signal connection between the optical module and the OLT board. The matching circuit provides power supply for the optical module and controls the connection and disconnection of the power supply, connects the management interface of the optical module, controls a signal to a CPU and the PON MAC module of the OLT line card, connects, to the PON MAC module, a received serdes electrical signal of a transmitter of the optical module and a sent serdes electrical signal of a receiver. The modification is made to adapt to the difference of different optical modules.

In this embodiment of this application, a sent serdes electrical signal of the optical receiver of the GPON OLT optical module is the LVPECL level, and a sent serdes electrical signal of the XG-PON OLT optical module and a sent serdes electrical signal of the XGS-PON OLT optical module are CML levels. The two levels have different on-board matching methods. For this problem, several different solutions may be selected in this embodiment of this application.

Figure 10:
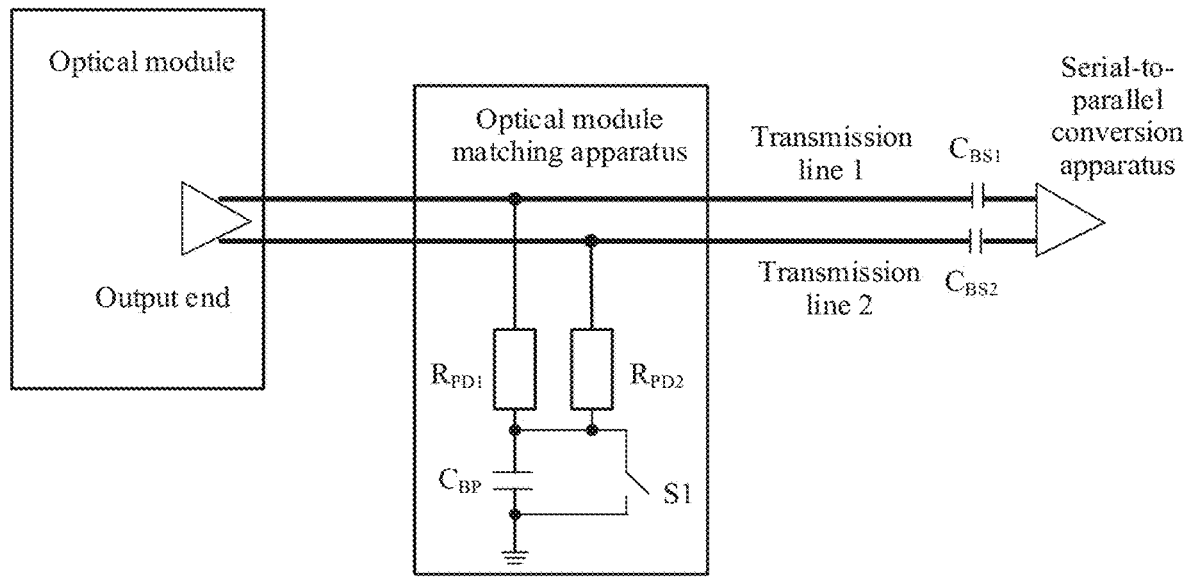
FIG. 10 is a schematic diagram of a composition structure of another optical module matching apparatus according to an embodiment of this application.

In some embodiments of this application, FIG. 10 is a schematic diagram of a composition structure of an optical module matching apparatus according to an embodiment of this application. The optical module matching apparatus includes: a first resistor, a second resistor, a first switch, a first capacitor, and two transmission lines.

The first switch includes a control end.

An input end and an output end are respectively connected to two ends of the transmission line.

The first resistor and the second resistor are connected in series and then bridged between the two transmission lines.

An intermediate point between the first resistor and the second resistor that are connected in series is connected to a ground point by using the first capacitor.

The first switch is bridged between the intermediate point and the ground point.

A first control signal controls the first switch to be opened so that the optical module matching apparatus is in a first working mode. A second control signal controls the first switch to be closed so that the optical module matching apparatus is in a second working mode.

Alternatively, the first control signal controls the first switch to be closed so that the optical module matching apparatus is in the first working mode. The second control signal controls the first switch to be opened so that the optical module matching apparatus is in the second working mode.

In FIG. 10, the first resistor is $R_{PD1}$, the second resistor is $R_{PD2}$, the first switch is S1, the first capacitor is $C_{BP}$, and the two transmission lines are respectively a transmission line 1 and a transmission line 2. The first switch S1 includes the control end. A processor of an OLT board is connected to the control end. The two ends of the transmission line are respectively connected to the input end and the output end of the optical module matching apparatus. The input end of the optical module matching apparatus is connected to an output end of an optical module, and the output end of the optical module matching apparatus is connected to a serial-to-parallel conversion apparatus. The first resistor and the second resistor are connected in series and then bridged between the two transmission lines. One end of the first resistor $R_{PD1}$ is connected to the transmission line 1, one end of the second resistor $R_{PD2}$ is connected to the transmission line 2, and the other end of the first resistor $R_{PD1}$ and the other end of the second resistor $R_{PD2}$ are connected in series. The intermediate point between the first resistor and the second resistor that are connected in series is connected to the ground point by using the first capacitor, and the first switch is bridged between the intermediate point and the ground point. Therefore, the processor of the OLT board may control the first switch to be opened or closed through the control end. For example, the first control signal controls the first switch to be opened so that the optical module matching apparatus is in the first working mode. The second control signal controls the first switch to be closed so that the optical module matching apparatus is in the second working mode. For another example, the first control signal controls the first switch to be closed so that the optical module matching apparatus is in the first working mode, and the second control signal controls the first switch to be opened so that the optical module matching apparatus is in the second working mode. In actual application, the processor may determine, based on an identified type of the optical module, whether the first switch is opened or closed.

For example, the optical module matching apparatus includes a matching circuit shown in FIG. 10. The matching circuit may work in different modes to adapt to a difference between an LVPECL level and a CML level. Through control of the first switch S1, the matching circuit may work in two different states. A PECL level refers to a 5 V voltage, and "LV" in the LVPECL level refers to a low-voltage (for example, 3.3 V). Generally, a PON OLT optical module uses a 3.3 V power supply. Therefore, the LVPECL level is used. Because differential signals are used, there are two transmission lines, and each transmission line needs to be connected to a pull-down resistor. Therefore, each transmission line needs to be connected to a resistor.

Figure 11:
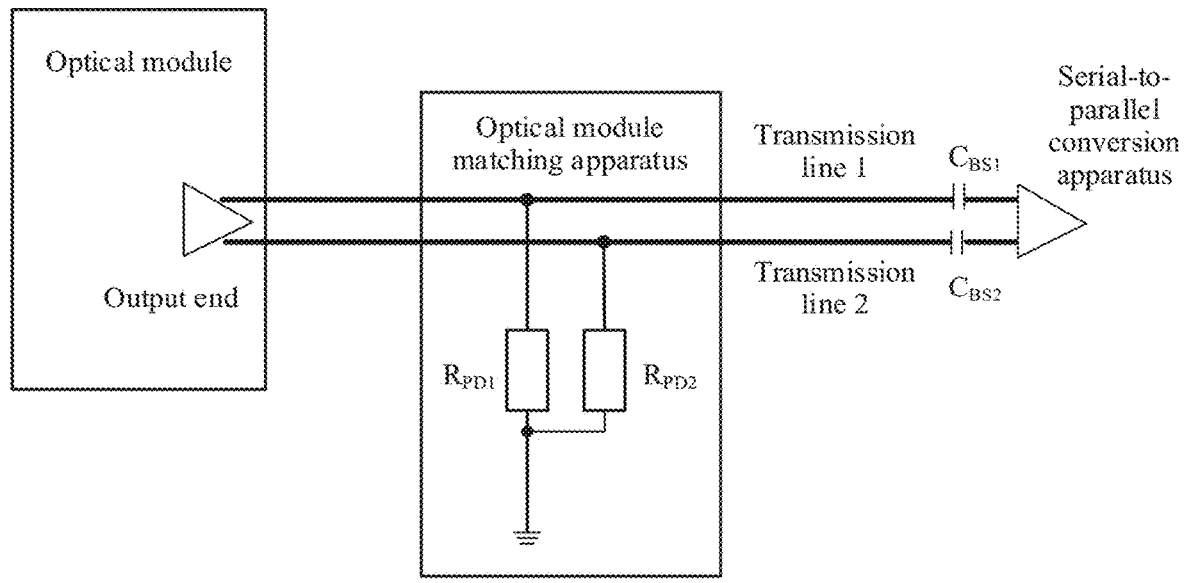
FIG. 11 is a schematic diagram of a composition structure of another optical module matching apparatus according to an embodiment of this application.

FIG. 11 is a schematic diagram of an equivalent circuit in an LVPECL mode according to an embodiment of this application. When the first switch S1 is closed, the matching circuit works in the LVPECL mode, and the equivalent circuit is shown in FIG. 11. In the LVPECL mode, the matching circuit is equivalent to the standard LVPECL pull-down matched circuit. To ensure that the LVPECL output works properly, a resistor with a resistance ranging from 150 ohms to 200 ohms is selected for the $R_{pd}$.

Figure 12:
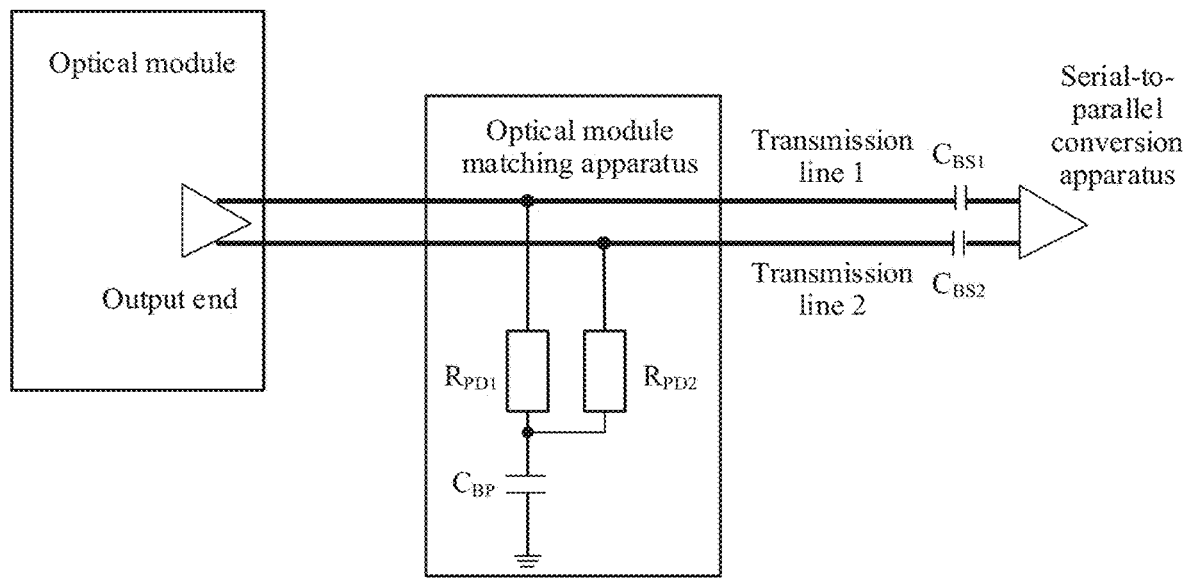
FIG. 12 is a schematic diagram of a composition structure of another optical module matching apparatus according to an embodiment of this application.

FIG. 12 is a schematic diagram of an equivalent circuit in a CML mode according to an embodiment of this application. When the first switch S1 is opened, the matching circuit works in the CML mode, and the equivalent circuit is shown in FIG. 12. In the CML mode, two $R_{pd}$ resistors are connected in series and then bridged between a P differential signal and an N differential signal, and an intermediate point is grounded by using a first capacitor. Because the resistor has large resistance, negative impact (insertion loss and reflection) on signal transmission is relatively small.

Figure 13:
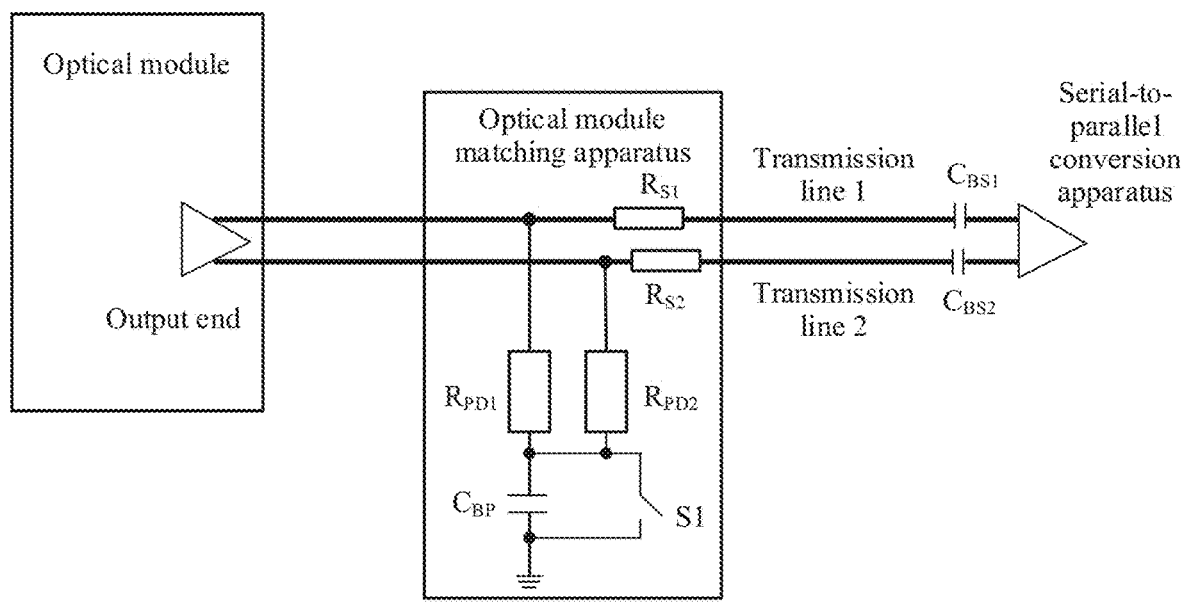
FIG. 13 is a schematic diagram of a composition structure of another optical module matching apparatus according to an embodiment of this application.

In some embodiments of this application, FIG. 13 is a schematic diagram of a composition structure of another optical module matching apparatus according to an embodiment of this application. An eighth resistor and a third capacitor are respectively connected in series on the transmission line.

The eighth resistor is configured to attenuate a swing of a first serial signal or a swing of a second serial signal.

The third capacitor is configured to isolate a direct current signal.

In FIG. 13, the eighth resistors are an $R_{S1}$ and an $R_{S2}$, and the third capacitors are a $C_{BS1}$ and a $C_{BS2}$. To reduce signal reflection caused by the optical module matching apparatus, a transmission line serial resistor $R_s$ may be placed close to the $R_{PD}$, to optimize signal reflection close to an output side. In addition, a swing in the LVPECL mode may be reduced, to adapt to a swing requirement of a serdes input port. In addition, in this embodiment of this application, the third capacitor is connected in series to the transmission line, to isolate the direct current signal so that an alternating-current signal can be transmitted to the serial-to-parallel conversion apparatus.

Figure 14:
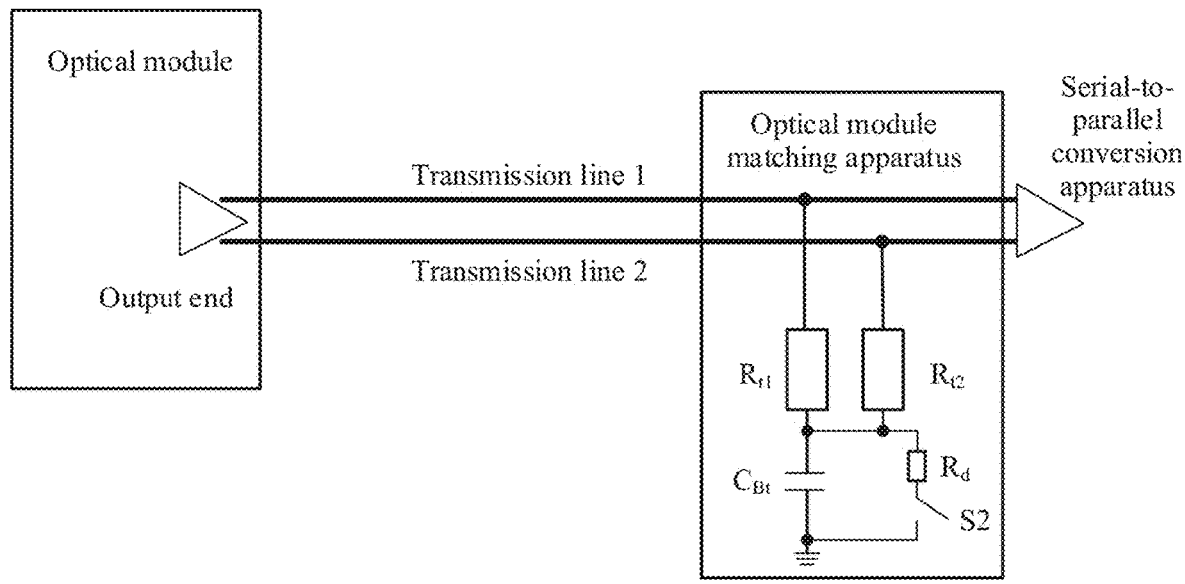
FIG. 14 is a schematic diagram of a composition structure of another optical module matching apparatus according to an embodiment of this application.

In some embodiments of this application, FIG. 14 is a schematic diagram of a composition structure of another optical module matching apparatus according to an embodiment of this application. The optical module matching apparatus provided in this embodiment of this application may include a third resistor, a fourth resistor, a fifth resistor, a second switch, and a second capacitor.

The second switch includes a control end.

The third resistor and the fourth resistor are connected in series and then bridged between the two transmission lines.

An intermediate point between the third resistor and the fourth resistor that are connected in series is connected to the ground point by using the second capacitor.

The fifth resistor and the second switch are connected in series and then bridged between the intermediate point and the ground point.

A first control signal controls the second switch to be opened so that the optical module matching apparatus is in a first working mode. A second control signal controls the second switch to be closed so that the optical module matching apparatus is in a second working mode.

Alternatively, the first control signal controls the second switch to be closed so that the optical module matching apparatus is in the first working mode. The second control signal controls the second switch to be opened so that the optical module matching apparatus is in the second working mode.

In FIG. 14, the third resistor is $R_{t1}$, the fourth resistor is $R_{t2}$, the fifth resistor is $R_d$, the second switch is S2, the second capacitor is $C_{Bt}$, and the two transmission lines are respectively a transmission line 1 and a transmission line 2. The second switch S2 includes the control end. A processor of an OLT board is connected to the control end. Two ends of the transmission line are respectively connected to an input end and an output end of the optical module matching apparatus. The input end of the optical module matching apparatus is connected to an output end of an optical module, and the output end of the optical module matching apparatus is connected to a serial-to-parallel conversion apparatus. The third resistor and the fourth resistor are connected in series and then bridged between the two transmission lines. One end of the third resistor $R_{t1}$ is connected to the transmission line 1, one end of the fourth resistor $R_{t2}$ is connected to the transmission line 2, and the other end of the third resistor $R_{t1}$ and the other end of the fourth resistor $R_{t2}$ are connected in series. An intermediate point between the third resistor and the fourth resistor that are connected in series is connected to the ground point by using the second capacitor, and the fifth resistor $R_d$ and the second switch S2 are connected in series and then bridged between the intermediate point and the ground point. Therefore, the processor of the OLT board may control the second switch to be opened or closed through the control end. For example, the first control signal controls the second switch to be opened so that the optical module matching apparatus is in the first working mode. The second control signal controls the second switch to be closed so that the optical module matching apparatus is in the second working mode. For another example, the first control signal controls the second switch to be opened so that the optical module matching apparatus is in the first working mode. The second control signal controls the second switch to be closed so that the optical module matching apparatus is in the second working mode. Alternatively, the first control signal controls the second switch to be closed so that the optical module matching apparatus is in the first working mode, and the second control signal controls the second switch to be opened so that the optical module matching apparatus is in the second working mode.

For example, the optical module matching apparatus includes a matching circuit shown in FIG. 14. The matching circuit may work in different modes to adapt to a difference between an LVPECL level and a CML level. The matching circuit implements 100-ohm terminal matching and LVPECL pull-down bias at the same time. For example, values of Rt and Rd are 50 ohms. Rt is used for terminal matching, and Rt and Rd together are used for LVPECL pull-down bias.

Figure 15:
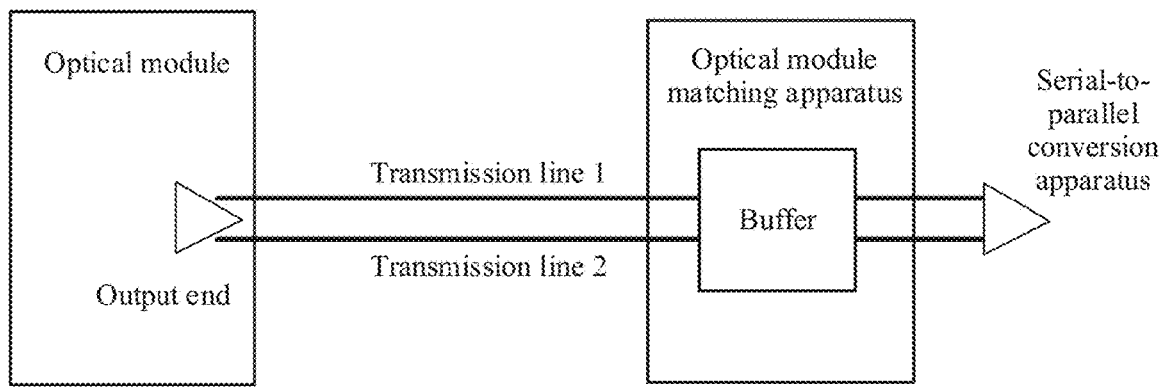
FIG. 15 is a schematic diagram of a composition structure of another optical module matching apparatus according to an embodiment of this application.

The matching circuit shown in FIG. 14 uses a direct-current coupling manner, which causes a relatively high common-mode voltage of a signal input by the serial-to-parallel conversion apparatus. For example, the serial-to-parallel conversion apparatus may be a serdes input end. Serdes electrical signals that are of a 3.3V LVPECL level and a 3.3V CML level and that are currently output by a receiver of the optical module are used as an example. The common-mode voltages are about 2 V and 3 V respectively. However, as the integration and complexity of the PON MAC module increase, the 16 nm process is generally used, and it is difficult to support such a high common-mode voltage. To resolve a problem that the serdes cannot input such a high common-mode voltage, referring to FIG. 15, the optical module matching apparatus provided in this embodiment of this application includes a buffer and two transmission lines.

The buffer includes a control end.

An input end and an output end are respectively connected to two ends of the transmission line.

An output end of the buffer is connected in series to the two transmission lines in an alternating-current coupling manner.

The buffer includes the control end. A processor of an OLT board is connected to the control end. The two ends of the transmission line are respectively connected to the input end and the output end of the optical module matching apparatus. The input end of the optical module matching apparatus is connected to an output end of an optical module, and the output end of the optical module matching apparatus is connected to a serial-to-parallel conversion apparatus. The buffers are bridged between the two transmission lines. To resolve a prior-art problem that a common-mode voltage of a signal input by the serial-to-parallel conversion apparatus is relatively high, the output end of the buffer is connected in series to the two transmission lines in the alternating-current coupling manner. After outputting a signal, the buffer can be used to connect to a serdes input port in the alternating-current coupling manner to solve the problem that the common-mode voltage is too high after a direct-current coupling of the electrical signal output by the optical module.

Figure 16:
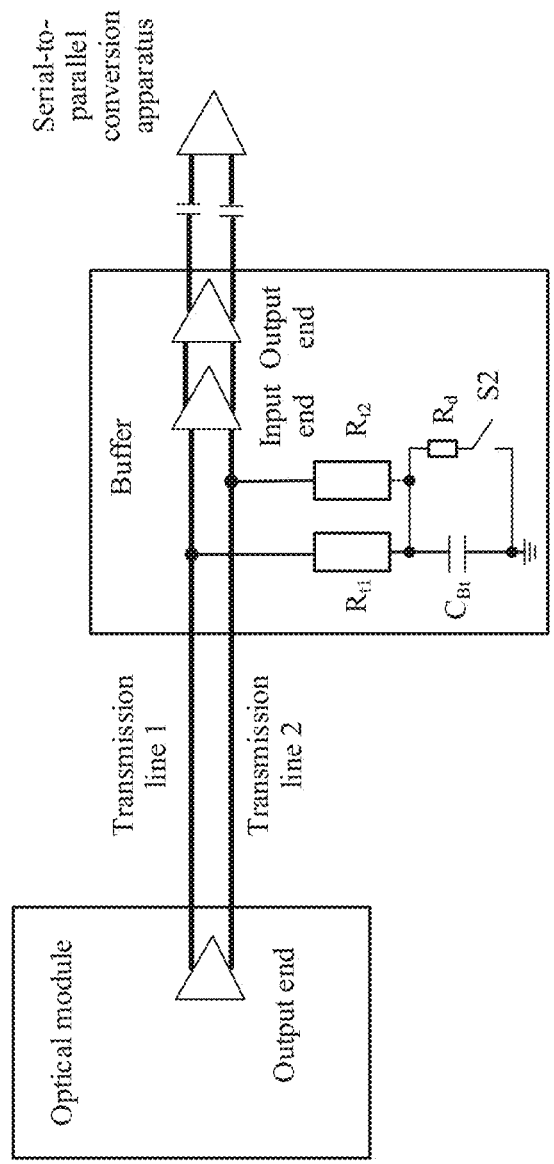
FIG. 16 is a schematic diagram of a networking structure of a buffer according to an embodiment of this application.

Further, in some embodiments of this application, as shown in FIG. 16, the buffer provided in this embodiment of this application includes a third resistor, a fourth resistor, a fifth resistor, a second switch, and a second capacitor.

The second switch includes a control end.

The third resistor and the fourth resistor are connected in series and then bridged between the two transmission lines.

An intermediate point between the third resistor and the fourth resistor that are connected in series is connected to the ground point by using the second capacitor.

The fifth resistor and the second switch are connected in series and then bridged between the intermediate point and the ground point.

A first control signal controls the second switch to be opened so that the optical module matching apparatus is in a first working mode. A second control signal controls the second switch to be closed so that the optical module matching apparatus is in a second working mode.

Alternatively, the first control signal controls the second switch to be closed so that the optical module matching apparatus is in the first working mode. The second control signal controls the second switch to be opened so that the optical module matching apparatus is in the second working mode.

In FIG. 16, the third resistor is $R_{t1}$, the fourth resistor is $R_{t2}$, the fifth resistor is $R_d$, the second switch is S2, the second capacitor is $C_{Bt}$, and the two transmission lines are respectively a transmission line 1 and a transmission line 2. The second switch S2 includes the control end. A processor of an OLT board is connected to the control end. Two ends of the transmission line are respectively connected to an input end and an output end of the optical module matching apparatus. The input end of the optical module matching apparatus is connected to an output end of an optical module, and the output end of the optical module matching apparatus is connected to a serial-to-parallel conversion apparatus. The third resistor and the fourth resistor are connected in series and then bridged between the two transmission lines. One end of the third resistor $R_{t1}$ is connected to the transmission line 1, one end of the fourth resistor $R_{t2}$ is connected to the transmission line 2, and the other end of the third resistor $R_{t1}$ and the other end of the fourth resistor $R_{t2}$ are connected in series. An intermediate point between the third resistor and the fourth resistor that are connected in series is connected to the ground point by using the second capacitor, and the fifth resistor $R_d$ and the second switch S2 are connected in series and then bridged between the intermediate point and the ground point. Therefore, the processor of the OLT board may control the second switch to be opened or closed through the control end. For example, the first control signal controls the second switch to be opened so that the optical module matching apparatus is in the first working mode. The second control signal controls the second switch to be closed so that the optical module matching apparatus is in the second working mode. For another example, the first control signal controls the second switch to be opened so that the optical module matching apparatus is in the first working mode. The second control signal controls the second switch to be closed so that the optical module matching apparatus is in the second working mode. Alternatively, the first control signal controls the second switch to be closed so that the optical module matching apparatus is in the first working mode. The second control signal controls the second switch to be opened so that the optical module matching apparatus is in the second working mode.

In this embodiment of this application, the buffer includes an input end and the output end that have a level compatibility matching function. Direct-current coupling terminal matching circuits of the LVPECL level and the CML level may be used as output ports of the buffer, and after outputting a signal, the buffer is connected to a serdes input port in an alternating-current coupling manner. The buffer provided in this embodiment of this application can buffer a signal. Because the serdes uses a technology such as 16 nm, a problem that an input common-mode voltage cannot be very wide is caused. The function of the buffer is simple and can be implemented by using a process that has a good tolerance capability for a common-mode level of a signal to isolate damage caused by the common-mode level to a subsequent serdes input port. The buffer provided in this embodiment of this application can resolve the problem that the common-mode voltage is excessively high after a direct-current coupling of the electrical signal output by the optical module.

Figure 17:
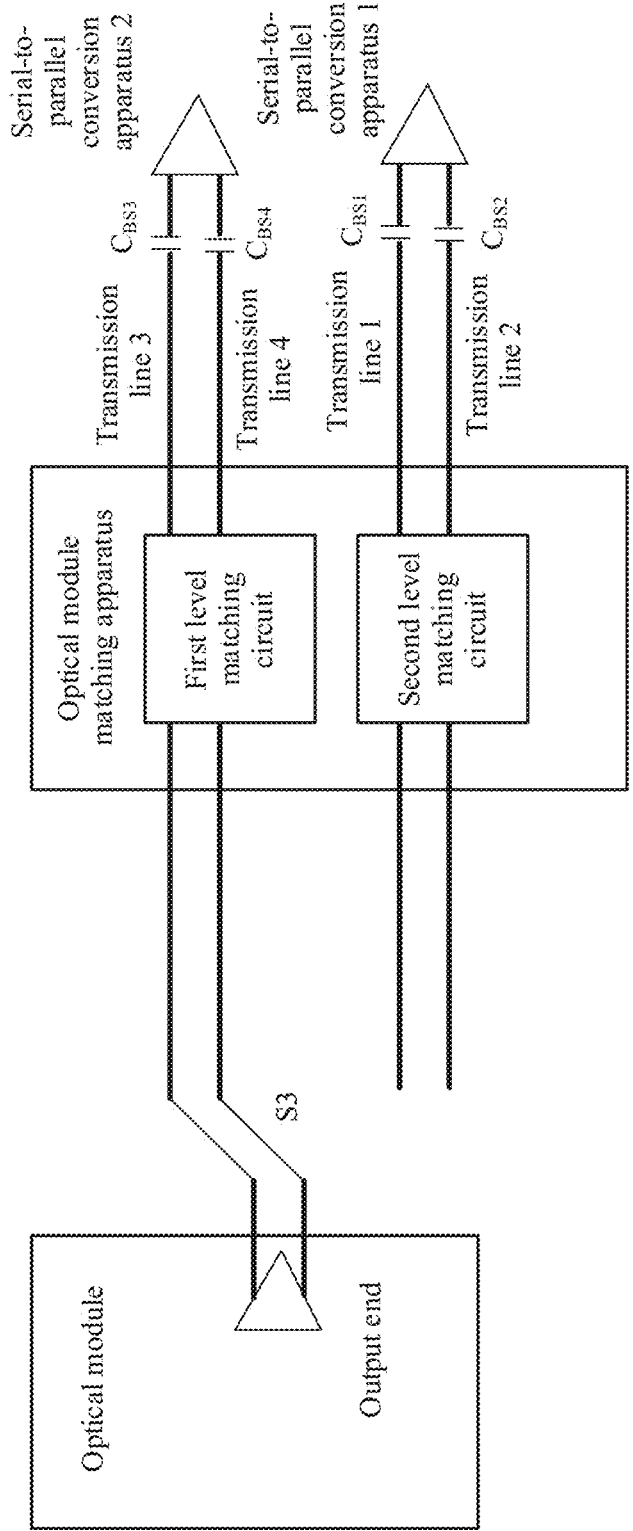
FIG. 17 is a schematic diagram of a composition structure of another optical module matching apparatus according to an embodiment of this application.

In some embodiments of this application, FIG. 17 shows another optical module matching apparatus according to an embodiment of this application. The optical module matching apparatus includes a third switch, a first level matching circuit, and a second level matching circuit.

The third switch includes a control end.

A first control signal controls the third switch to switch to the first level matching circuit so that the optical module matching apparatus is in a first working mode, and an input end and an output end are respectively connected to two ends of the first level matching circuit. A second control signal controls the third switch to switch to the second level matching circuit so that the optical module matching apparatus is in a second working mode, and the input end and the output end are respectively connected to two ends of the second level matching circuit.

The first level matching circuit is configured to output a first serial signal, and the second level matching circuit is configured to output a second serial signal.

In FIG. 17, the third switch is S3, the third switch S3 may be a double-throw switch, and the first level matching circuit is connected in series to a transmission line 3 and a transmission line 4. The second level matching circuit is connected in series to a transmission line 1 and a transmission line 2. The third switch S3 includes the control end. A processor of an OLT board is connected to the control end. An output end of the first level matching circuit is connected to a serial-to-parallel conversion apparatus 2, and an output end of the second level matching circuit is connected to a serial-to-parallel conversion apparatus 1. The processor of the OLT board may control, by using the control end, the third switch to switch to the first level matching circuit or switch to the second level matching circuit. For example, the first control signal controls the third switch to switch to the first level matching circuit so that the optical module matching apparatus is in the first working mode, and the input end and the output end of the optical module matching apparatus are separately connected to the two ends of the first level matching circuit. The second control signal controls the third switch to switch to the second level matching circuit so that the optical module matching apparatus is in the second working mode, and the input end and the output end of the optical module matching apparatus are respectively connected to the two ends of the second level matching circuit.

In this embodiment of this application, the optical module matching apparatus may switch, by using the third switch, a signal output by the optical module to a different level matching circuit so that a device bandwidth performance of the third switch meets a high-frequency switching requirement. When a level type of the signal output by the optical module is a CML level, the third switch is switched to a fixed contact set 1, and the level matching circuit is in a CML alternating current coupling manner. When the level type of the signal output by the optical module is an LVPECL level, the third switch is switched to a fixed contact group 2, and the level matching circuit is in an LVPECL coupling manner. The serial-to-parallel conversion apparatus 1 and the serial-to-parallel conversion apparatus 2 may be respectively connected to a PON MAC module so that the PON MAC module uses different serdes input ports when the optical module outputs signals of different levels.

Figure 18:
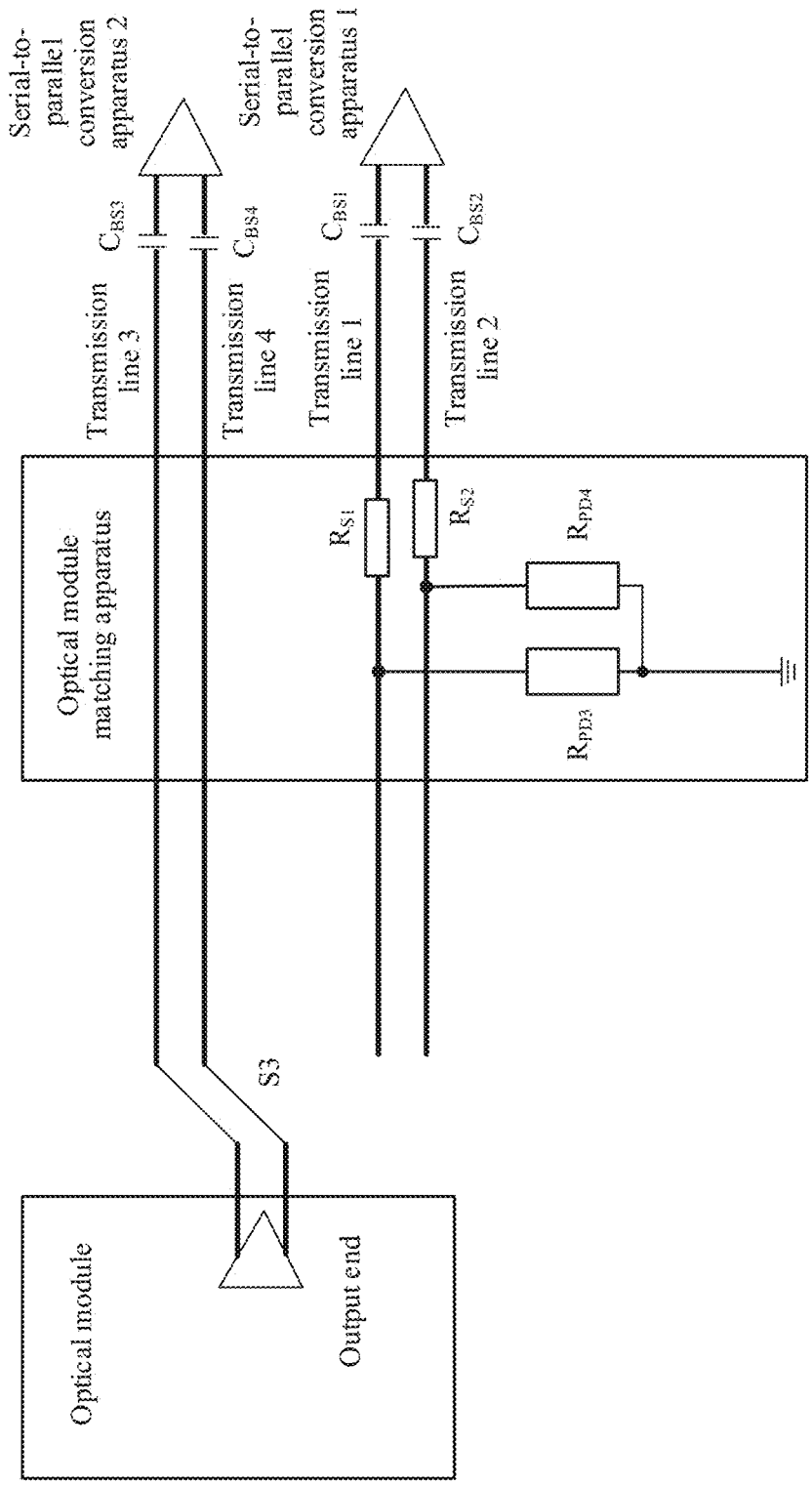
FIG. 18 is a schematic diagram of a composition structure of another optical module matching apparatus according to an embodiment of this application.

Further, in some embodiments of this application, FIG. 18 is a schematic diagram of another optical module matching apparatus according to an embodiment of this application. Specifically, a first level matching circuit includes two transmission lines.

The first control signal controls the third switch to switch to the first level matching circuit, and an input end and an output end of the optical module matching apparatus are separately connected to two ends of the transmission line.

The first level matching circuit is connected to the serial-to-parallel conversion apparatus 2, and the serial-to-parallel conversion apparatus 2 may be configured to input a CML signal. In this case, no pull-down resistor needs to be used.

Further, in some embodiments of this application, FIG. 18 is a schematic diagram of another optical module matching apparatus according to an embodiment of this application. Specifically, a second level matching circuit includes a sixth resistor, a seventh resistor, and two transmission lines.

The first control signal controls the third switch to switch to the first level matching circuit. The input end and the output end are separately connected to the two ends of the transmission line.

The sixth resistor and the seventh resistor are connected in series and then bridged between the two transmission lines.

An intermediate point between the sixth resistor and the seventh resistor that are connected in series is connected to a ground point.

In FIG. 18, the sixth resistor is $R_{PD3}$, the seventh resistor is $R_{PD4}$, the third switch is S3, and the two transmission lines are respectively a transmission line 1 and a transmission line 2. The third switch S3 includes a control end. A processor of an OLT board is connected to the control end. The two ends of the transmission line are respectively connected to the input end and the output end of the optical module matching apparatus. The input end of the optical module matching apparatus is connected to an output end of an optical module, and the output end of the optical module matching apparatus is connected to a serial-to-parallel conversion apparatus 1 or a serial-to-parallel conversion apparatus 2. The sixth resistor and the seventh resistor are connected in series and then bridged between the two transmission lines. One end of the sixth resistor $R_{PD3}$ is connected to the transmission line 1, one end of the seventh resistor $R_{PD4}$ is connected to the transmission line 2, the other end of the sixth resistor $R_{PD3}$ and the other end of the seventh resistor $R_{PD4}$ are connected in series, and the intermediate point between the sixth resistor and the seventh resistor that are connected in series is connected to the ground point. The sixth resistor is $R_{PD3}$. The seventh resistor is $R_{PD4}$, configured to pull-down matching of an LVPECL. The serial-to-parallel conversion apparatus 1 is configured to input a signal of an LVPECL level.

In some embodiments of this application, FIG. 18 is a schematic diagram of a composition structure of another optical module matching apparatus according to an embodiment of this application. An eighth resistor and a third capacitor are respectively connected in series on the transmission line.

The eighth resistor is configured to attenuate a swing of a first serial signal or a swing of a second serial signal.

The third capacitor is configured to isolate a direct current signal.

In FIG. 18, the eighth resistors are $R_{S1}$ and $R_{S2}$, and the third capacitors are $C_{BS1}$, $C_{BS2}$, $C_{BS3}$, and $C_{BS4}$. To reduce signal reflection caused by the optical module matching apparatus, a transmission line serial resistor $R_s$ may be placed close to the $R_{PD}$ to optimize signal reflection close to an output side. In addition, a swing in the LVPECL mode may be reduced, to adapt to a swing requirement of a serdes input port. In addition, in this embodiment of this application, the third capacitor is connected in series to the transmission line, to isolate the direct current signal so that an alternating-current signal can be transmitted to the serial-to-parallel conversion apparatus.

Figure 19:
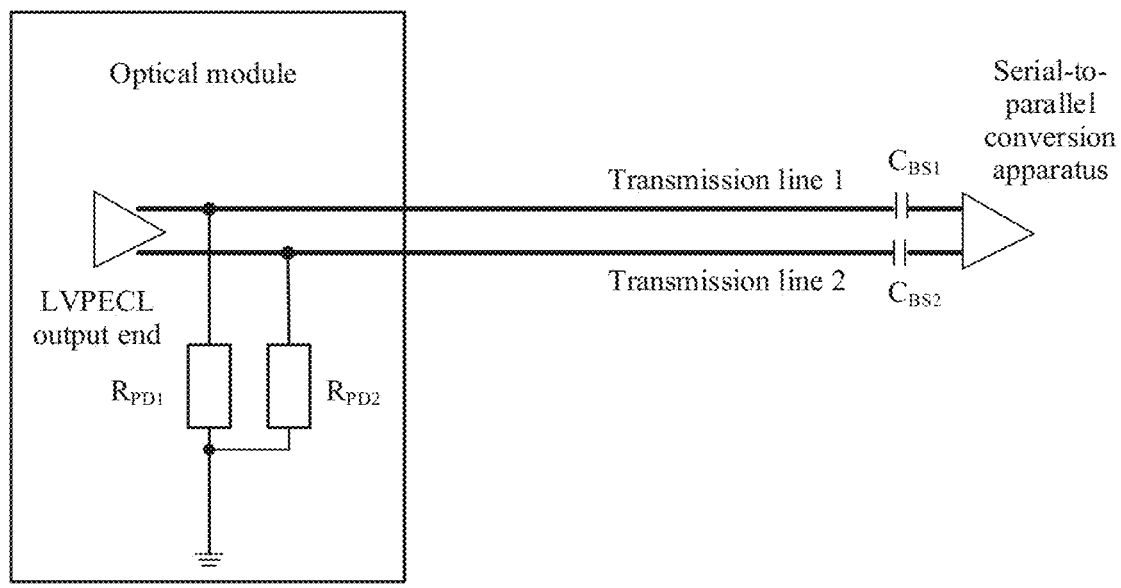
FIG. 19 is a schematic diagram of a composition structure of an optical module according to an embodiment of this application.
Figure 20:
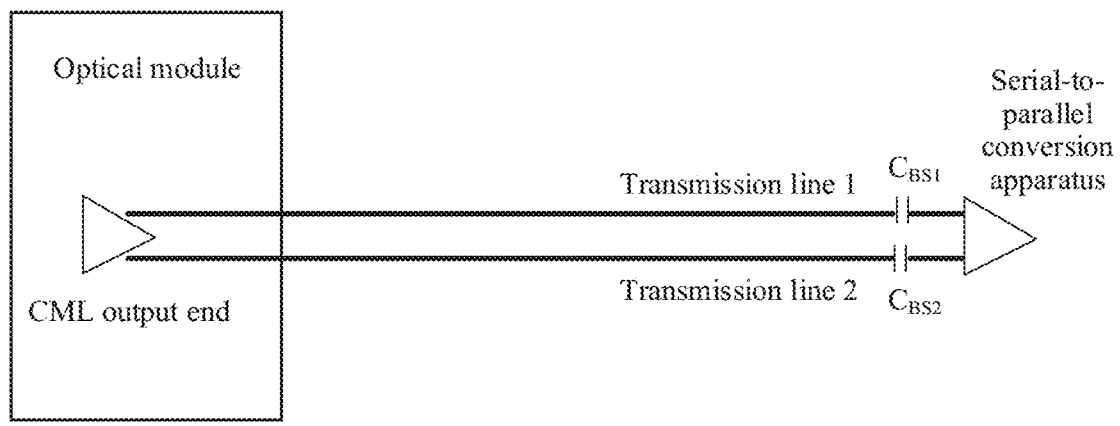
FIG. 20 is a schematic diagram of a composition structure of another optical module according to an embodiment of this application.

In some embodiments of this application, FIG. 19 and FIG. 20 are respectively schematic diagrams of another optical module matching apparatus according to an embodiment of this application. When an optical module includes an LVPECL output end, the optical module includes a pull-down resistor. When the optical module includes the CML output end, the pull-down resistor does not need to be used in the optical module. For the optical module, if the pull-down resistor is a component inside the optical module, the optical module can output a signal of an LVPECL level after internal pull-down. The optical module is designed to be compatible so that the optical module matching apparatus can be compatible with a plurality of different optical modules.

The following describes in detail the MAC chip provided in this embodiment of this application. The MAC chip may include a PON MAC module compatible with different PON protocols. The PON MAC module can provide a media access control function that is specified in the PON protocol and that is already specified in a related protocol. Details are not described again. Particularly, different generations of PON protocols use different MAC protocols. The PON MAC needs to support the different generations of PON protocols and may flexibly switch to support the latest generation of PON protocol or support a PON protocol that is compatible with an optical module. In this embodiment of this application, the MAC chip may be implemented by using a multi-mode PON MAC that supports different generations of PON protocols, or by using the PON MAC module that integrates different PON protocols.

The following describes the processor in this embodiment of this application in detail. The processor is configured to detect and identify different generations of optical modules, configure the optical module matching apparatus, and configure or switch the PON protocol used by the PON MAC module. The processor may be an existing processor of an OLT board, and on the basis of the processor, support for the foregoing functions is added through software and hardware extension. Alternatively, an extra processor component is added again, to implement the optical module compatibility function in the foregoing embodiments of this application. For example, when the optical module needs to be detected and identified, the processor needs to extend an I2C interface to connect to the optical module. To control the optical module matching apparatus, the processor needs to send a control signal by using a control end of the optical module matching apparatus.

For example, in this embodiment of this application, a type of the optical module may be detected and identified in different implementations. For example, the type of the optical module may be automatically identified by using an optical module management interface (such as I2C) to read optical module information. For another example, an operator delivers the configuration information in a manner of a network management system, a command line, or the like based on the type of the inserted optical module.

The optical communications apparatus provided in this embodiment of this application can reduce resource waste and economic losses that are caused by upgrading a PON technology, upgrade and replace a granularity from the OLT board to a port, and improve flexibility. In this embodiment of this application, the PON line card is compatible with a previous generation of PON optical module. For example, the PON line card may be compatible with a GPON OLT optical module, or may be compatible with another generation of PON OLT optical module.

Figure 21:
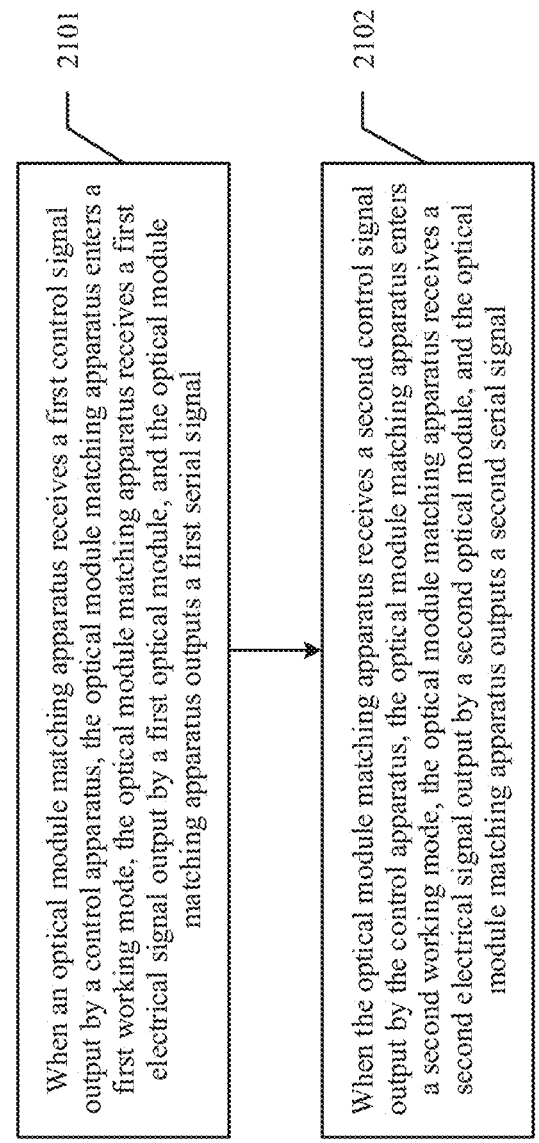
FIG. 21 is a schematic block flowchart of an optical communication processing method according to an embodiment of this application.

The foregoing embodiments of this application describe the optical communications apparatus and the OLT. The following describes an optical communication processing method provided in an embodiment of this application. As shown in FIG. 21, the optical communication processing method provided in this embodiment of this application includes the following steps.

2101: When an optical module matching apparatus receives a first control signal output by a control apparatus, the optical module matching apparatus enters a first working mode, the optical module matching apparatus receives a first electrical signal output by a first optical module, and the optical module matching apparatus outputs a first serial signal.

2102: When the optical module matching apparatus receives a second control signal output by the control apparatus, the optical module matching apparatus enters a second working mode, the optical module matching apparatus receives a second electrical signal output by a second optical module, and the optical module matching apparatus outputs a second serial signal.

The first electrical signal and the second electrical signal have different level types.

It should be noted that there is no requirement on a sequence of performing the step 2101 and the step 2102. When the control apparatus outputs different control signals, the optical module matching apparatus determines to perform a specific step. For example, when the control apparatus outputs the first control signal, the optical module matching apparatus performs the step 2101. For another example, when the control apparatus outputs the second control signal, the optical module matching apparatus performs the step 2102. For example, in FIG. 21, an example in which the step 2101 is first performed and then the step 2102 is performed is used for description.

In the foregoing method embodiment provided in this application, the control apparatus outputs the first control signal to the control end so that the optical module matching apparatus is in the first working mode. The optical module matching apparatus receives the first electrical signal output by the first optical module, and the optical module matching apparatus outputs the first serial signal. The control apparatus outputs the second control signal to the control end so that the optical module matching apparatus is in the second working mode. The optical module matching apparatus receives the second electrical signal output by the second optical module, and the optical module matching apparatus outputs the second serial signal. When the optical module matching apparatus provided in this embodiment of this application inputs different electrical signals, the optical module matching apparatus may output different serial signals. Therefore, the optical module matching apparatus in this embodiment of this application may be configured to connect to different optical modules so that a same optical module matching apparatus can be compatible with different generations of optical modules. When a user does not need to upgrade an optical module or an ONU, the user does not need to upgrade or replace the optical module or the ONU. This reduces costs. In addition, when the user needs to upgrade the optical module and the ONU, the optical module matching apparatus compatible with the different optical modules is used in the optical communications apparatus, and the entire optical communications apparatus does not need to be upgraded. This reduces costs.

In some embodiments of this application, an optical module is inserted into the optical module matching apparatus. The optical communication processing method provided in this embodiment of this application further includes.

The control apparatus reads an optical module identification code from the optical module.

When the optical module identification code indicates the first optical module, the control apparatus outputs the first control signal.

When the optical module identification code indicates the second optical module, the control apparatus outputs the second control signal.

In this embodiment of this application, each optical module has a corresponding optical module identification code, and the optical module identification code may be a type identifier of the optical module. For example, the control apparatus is connected to a register of the optical module through an optical module management interface, and the control apparatus reads optical module information through the optical module management interface (for example, an I2C interface) to automatically identify, the optical module identifier. If the optical module identification code indicates the first optical module, the control apparatus may output the first control signal, and the first control signal is sent to the optical module matching apparatus by using the control end. If the optical module identification code indicates the second optical module, the control apparatus may output the second control signal, and the second control signal is sent to the optical module matching apparatus by using the control end.

In some embodiments of this application, an optical module is inserted into the optical module matching apparatus. The optical communication processing method provided in this embodiment of this application further includes:

The control apparatus reads configuration information through a management port of the optical communications apparatus.

When the configuration information indicates the first optical module, the control apparatus outputs the first control signal.

When the configuration information indicates the second optical module, the control apparatus outputs the second control signal.

In this embodiment of this application, an operator of the PON communications system may further deliver the configuration information of the optical module in a manner of a network management system, a command line, or the like based on a type of the optical module actually inserted into the optical communications apparatus so that the control apparatus can automatically identify the optical module identifier. If the configuration information indicates the first optical module, the control apparatus may output the first control signal, and the first control signal is sent to the optical module matching apparatus by using the control end. If the configuration information indicates the second optical module, the control apparatus may output the second control signal, and the second control signal is sent to the optical module matching apparatus by using the control end.

It should be noted that, for brief description, the foregoing method performed by the processor is described as a series of actions. However, a person skilled in the art should know that this application is not limited to the described order of the actions, because according to this application, some steps may be performed in another order or performed simultaneously. It should be further appreciated by a person skilled in the art that the embodiments described in this specification all belong to example embodiments, and the involved actions and modules are not necessarily required by this application.

In addition, it should be noted that the described optical module matching apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by this application, connection relationships between modules indicate that the modules have connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to some or all embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An optical communications apparatus comprising:
a control apparatus;
an optical module matching apparatus, wherein the control apparatus is connected to a control end of the optical module matching apparatus; and
one or more memories coupled to the control apparatus and storing programming instructions for execution by the control apparatus to:
output a first control signal to the control end, wherein the optical module matching apparatus enters a first working mode based on the first control signal, wherein an input end of the optical module matching apparatus connects to a first optical module and receives a first electrical signal output by the first optical module, wherein an output end of the optical module matching apparatus outputs a first serial signal; and
output a second control signal to the control end, wherein the optical module matching apparatus enters a second working mode based on the second control signal, wherein the input end of the optical module matching apparatus connects to a second optical module and receives a second electrical signal output by the second optical module, wherein the output end of the optical module matching apparatus outputs a second serial signal, and wherein the first electrical signal and the second electrical signal have different level types.

2. The optical communications apparatus according to claim 1, wherein the first electrical signal and the second electrical signal have different serial data rates.

3. The optical communications apparatus according to claim 1, wherein the optical communications apparatus further comprises at least one of the first optical module or the second optical module.

4. The optical communications apparatus according to claim 1, wherein the optical communications apparatus further comprises a media access control (MAC) chip, wherein:
the control apparatus is connected to the MAC chip, the MAC chip supports a first optical communication protocol and a second optical communication protocol, and the output end of the optical module matching apparatus is connected to the MAC chip;
when the first serial signal is output to the MAC chip, the MAC chip parses the first serial signal according to the first optical communication protocol; and
when the second serial signal is output to the MAC chip, the MAC chip parses the second serial signal according to the second optical communication protocol.

5. The optical communications apparatus according to claim 4, wherein optical signals respectively generated by using the first optical communication protocol and the second optical communication protocol have different serial data rates.

6. The optical communications apparatus according to claim 4, wherein the first optical communication protocol and the second optical communication protocol are respectively one of a gigabit-capable passive optical network (GPON) protocol, a 10 gigabit-capable passive optical network (XG-PON) protocol, or a 10 gigabit-capable symmetric passive optical network (XGS-PON) protocol, and wherein the first optical communication protocol and the second optical communication protocol are two different protocols.

7. The optical communications apparatus according to claim 1, wherein the optical module matching apparatus comprises a first resistor, a second resistor, a first switch, a first capacitor, and two transmission lines, wherein:
the first switch comprises the control end;
the input end and the output end are separately connected to two ends of a transmission line of the two transmission lines;
the first resistor and the second resistor are connected in series and then bridged between the two transmission lines;
an intermediate point between the first resistor and the second resistor is connected to a ground point by using the first capacitor;
the first switch is bridged between the intermediate point and the ground point; and
the first control signal controls the first switch to be opened, wherein the optical module matching apparatus enters the first working mode when the first switch is opened, wherein the second control signal controls the first switch to be closed, and wherein the optical module matching apparatus enters the second working mode when the first switch is closed; or
the first control signal controls the first switch to be closed, wherein the optical module matching apparatus enters the first working mode when the first switch is closed, wherein the second control signal controls the first switch to be opened, and wherein the optical module matching apparatus is in the second working mode when the first switch is opened.

8. The optical communications apparatus according to claim 1, wherein the optical module matching apparatus comprises a buffer and two transmission lines, wherein:
the buffer comprises the control end;
the input end and the output end are separately connected to two ends of a transmission line of the two transmission lines; and
an output end of the buffer is connected in series to the two transmission lines in an alternating-current coupling manner.

9. The optical communications apparatus according to claim 8, wherein the buffer comprises a third resistor, a fourth resistor, a fifth resistor, a second switch, and a second capacitor, wherein:

the second switch comprises the control end;
the third resistor and the fourth resistor are connected in series and then bridged between the two transmission lines;
an intermediate point between the third resistor and the fourth resistor that are connected in series is connected to a ground point by using the second capacitor;
the fifth resistor and the second switch are connected in series and then bridged between the intermediate point and the ground point; and
the first control signal controls the second switch to be opened, wherein the optical module matching apparatus enters the first working mode when the second switch is opened, and wherein the second control signal controls the second switch to be closed, wherein the optical module matching apparatus enters the second working mode when the second switch is closed; or
the first control signal controls the second switch to be closed, wherein the optical module matching apparatus enters the first working mode when the second switch is closed, and wherein the second control signal controls the second switch to be opened, wherein the optical module matching apparatus enters the second working mode when the second switch is opened.

10. The optical communications apparatus according to claim 1, wherein the optical module matching apparatus comprises a third switch, a first level matching circuit, and a second level matching circuit, wherein:
the third switch comprises the control end;
the first control signal controls the third switch to switch to the first level matching circuit, wherein the optical module matching apparatus enters the first working mode when the third switch is switched to the first level matching circuit, and wherein the input end and the output end are separately connected to two ends of the first level matching circuit;
the second control signal controls the third switch to switch to the second level matching circuit, wherein the optical module matching apparatus enters the second working mode when the third switch is switched to the second level matching circuit, and wherein the input end and the output end are separately connected to two ends of the second level matching circuit; and
the first level matching circuit outputs the first serial signal and the second level matching circuit outputs the second serial signal.

11. The optical communications apparatus according to claim 10, wherein the first level matching circuit comprises two transmission lines, wherein the first control signal controls the third switch to switch to the first level matching circuit, and wherein the input end and the output end are separately connected to two ends of a transmission line of the two transmission lines.

12. The optical communications apparatus according to claim 10, wherein the second level matching circuit comprises a sixth resistor, a seventh resistor, and two transmission lines, wherein:
the first control signal controls the third switch to switch to the second level matching circuit, wherein the input end and the output end are separately connected to two ends of the transmission line; and
an intermediate point between the sixth resistor and the seventh resistor that are connected in series is connected to a ground point.

13. The optical communications apparatus according to claim 1, wherein the programming instructions are for execution by the control apparatus to:
read an optical module identification code from an optical module;
output the first control signal when the optical module identification code indicates the first optical module; and
output the second control signal when the optical module identification code indicates the second optical module.

14. The optical communications apparatus according to claim 1, wherein the programming instructions are for execution by the control apparatus to:
receive configuration information input by a management port of the optical communications apparatus;
output the first control signal when the configuration information indicates the first optical module; and
output the second control signal when the configuration information indicates the second optical module.

15. The optical communications apparatus according to claim 1, wherein a level type of the first electrical signal is a low-voltage positive emitter-coupled logic (LVPECL) level, and wherein a level type of the second electrical signal is a current mode logic (CML) level.

16. The optical communications apparatus according to claim 1, wherein the control apparatus comprises a processor or a control circuit.

17. The optical communications apparatus according to claim 1, wherein the optical communications apparatus comprises a single board or a printed circuit board (PCB).

18. An optical line termination (OLT), wherein the OLT comprises an optical communications apparatus, wherein the optical communications apparatus comprises:
a control apparatus;
an optical module matching apparatus, wherein the control apparatus is connected to a control end of the optical module matching apparatus; and
one or more memories coupled to the control apparatus and storing programming instructions for execution by the control apparatus to:
output a first control signal to the control end, wherein the optical module matching apparatus enters a first working mode based on the first control signal, wherein an input end of the optical module matching apparatus connects to a first optical module and receives a first electrical signal output by the first optical module, wherein an output end of the optical module matching apparatus outputs a first serial signal; and
output a second control signal to the control end, wherein the optical module matching apparatus enters a second working mode based on the second control signal, wherein the input end of the optical module matching apparatus connects to a second optical module and receives a second electrical signal output by the second optical module, wherein the output end of the optical module matching apparatus outputs a second serial signal, and wherein the first electrical signal and the second electrical signal have different level types.

19. An optical communication processing method, wherein the method comprises:
in response to receiving a first control signal output by a control apparatus:
entering, by an optical module matching apparatus, a first working mode;
receiving, by the optical module matching apparatus, a first electrical signal output by a first optical module; and outputting, by the optical module matching apparatus, a first serial signal; or in response to receiving a second control signal output by a control apparatus:

entering, by the optical module matching apparatus, a second working mode;

receiving, by the optical module matching apparatus, a second electrical signal output by a second optical module; and outputting, by the optical module matching apparatus, a second serial signal; and wherein the first electrical signal and the second electrical signal have different level types.

20. The method according to claim 19, wherein the optical module matching apparatus is plugged with an optical module, and wherein the method further comprises:

reading, by the control apparatus, an optical module identification code from the optical module; and when the optical module identification code indicates the first optical module, outputting, by the control apparatus, the first control signal; or when the optical module identification code indicates the second optical module, outputting, by the control apparatus, the second control signal.

21. The method according to claim 19, wherein the optical module matching apparatus is plugged with an optical module, and wherein the method further comprises:

reading, by the control apparatus, configuration information through a management port of an optical communications apparatus; and when the configuration information indicates the first optical module, outputting, by the control apparatus, the first control signal; or when the configuration information indicates the second optical module, outputting, by the control apparatus, the second control signal.

\* \* \* \* \*